(12) United States Patent
Kim et al.

(10) Patent No.: US 12,309,862 B2
(45) Date of Patent: May 20, 2025

(54) ELECTRONIC DEVICE USING PLURALITY OF COMMUNICATION METHODS, AND METHOD FOR CONTROLLING SAME

(71) Applicant: Samsung Electronics Co., Ltd., Suwon-si (KR)

(72) Inventors: Moonsoo Kim, Suwon-si (KR); Mincheol Seo, Suwon-si (KR); Bokun Choi, Suwon-si (KR); Jaheon Gu, Suwon-si (KR); Youngkow Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 17/899,893

(22) Filed: Aug. 31, 2022

(65) Prior Publication Data

US 2022/0418025 A1 Dec. 29, 2022

Related U.S. Application Data

(63) Continuation of application No. PCT/KR2021/002348, filed on Feb. 25, 2021.

(30) Foreign Application Priority Data

Mar. 3, 2020 (KR) .......................... 10-2020-0026607

(51) Int. Cl.
*H04W 76/15* (2018.01)
*H04W 52/50* (2009.01)
(Continued)

(52) U.S. Cl.
CPC ........... *H04W 76/15* (2018.02); *H04W 52/50* (2013.01); *H04W 52/52* (2013.01); *H04W 72/0453* (2013.01); *H04W 76/14* (2018.02)

(58) Field of Classification Search
CPC ..... H04W 76/15; H04W 52/50; H04W 52/52; H04W 72/0453; H04W 76/14;
(Continued)

(56) References Cited

U.S. PATENT DOCUMENTS

2008/0067995 A1 3/2008 Chua-Eoan et al.
2010/0029216 A1 2/2010 Jovicic et al.
(Continued)

FOREIGN PATENT DOCUMENTS

EP 3389334 A1 10/2018
JP 2015-097314 A 5/2015
(Continued)

OTHER PUBLICATIONS

Extended European Search Report dated Jun. 22, 2023, issued in European Patent Application No. 21765513.3.

*Primary Examiner* — Brian T O Connor
(74) *Attorney, Agent, or Firm* — Jefferson IP Law, LLP

(57) ABSTRACT

An electronic device is provided. The electronic device includes a first communication circuit that supports a first communication method and a second communication circuit configured to support a second communication method, transmit, in at least one first band, a signal having a magnitude less than or equal to a first threshold value, and transmit, in at least one second band, a signal having a magnitude less than or equal to a second threshold value. The first communication circuit may be configured to form, based on the first communication method, a first connection to an external electronic device, the second communication circuit may be configured to transmit, based on a first function based on the first connection, having been executed, a signal having a magnitude less than or equal to the first threshold value, and the first threshold value may be less than the second threshold value.

21 Claims, 13 Drawing Sheets

(51) Int. Cl.
  *H04W 52/52*    (2009.01)
  *H04W 72/0453*  (2023.01)
  *H04W 76/14*    (2018.01)

(58) Field of Classification Search
  CPC ... H04W 52/367; H04W 84/12; H04W 52/28; H04W 88/06
  See application file for complete search history.

(56) References Cited

U.S. PATENT DOCUMENTS

| | | |
|---|---|---|
| 2015/0103816 A1 | 4/2015 | Nagara |
| 2016/0057803 A1 | 2/2016 | Kim et al. |
| 2016/0105789 A1 | 4/2016 | Chae |
| 2017/0093727 A1 | 3/2017 | Chen et al. |
| 2019/0037595 A1 | 1/2019 | Cherian et al. |
| 2020/0053534 A1 | 2/2020 | Bae et al. |
| 2020/0162205 A1 | 5/2020 | Han et al. |
| 2021/0058856 A1* | 2/2021 | Qi .................. H04W 76/14 |
| 2021/0120629 A1 | 4/2021 | Choi et al. |

FOREIGN PATENT DOCUMENTS

| | | |
|---|---|---|
| KR | 10-2010-0061188 A | 6/2010 |
| KR | 10-2016-0041620 A | 4/2016 |
| KR | 10-2017-0038659 A | 4/2017 |
| KR | 10-2018-0128302 A | 12/2018 |
| KR | 10-2019-0102441 A | 9/2019 |
| KR | 10-2020-0017175 A | 2/2020 |
| WO | 2018-182260 A1 | 10/2018 |
| WO | 2018-216904 A1 | 11/2018 |
| WO | 2019-164129 A1 | 8/2019 |

* cited by examiner

ELECTRONIC DEVICE USING PLURALITY OF COMMUNICATION METHODS, AND METHOD FOR CONTROLLING SAME

CROSS-REFERENCE TO RELATED APPLICATION(S)

This application is a continuation application, claiming priority under § 365(c), of an International application No. PCT/KR2021/002348, filed on Feb. 25, 2021, which is based on and claims the benefit of a Korean patent application number 10-2020-0026607, filed on Mar. 3, 2020, in the Korean Intellectual Property Office, the disclosure of which is incorporated by reference herein in its entirety.

BACKGROUND

1. Field

The disclosure relates to an electronic device using a plurality of communication schemes and a method of controlling the same.

2. Description of Related Art

Various services and additional functions are increasingly provided through an electronic device, for example, a portable electronic device, such as a smartphone. To increase the utilization of such electronic devices and satisfy various users' needs, communication service providers or electronic device manufacturers are competitively developing electronic devices to provide various functions and differentiate them from other companies. Accordingly, various functions provided through the electronic devices are also increasingly advanced.

SUMMARY

A wireless fidelity (Wi-Fi) communication service was provided using the 2.4 GHz band or the 5 GHz band. An electronic device provided a Wi-Fi service using a 72-MHz bandwidth of the 2.4 GHz band or a 670-MHz bandwidth of the 5 GHz band, which is a frequency band in which the Wi-Fi communication service is provided.

In order to meet various demands for Wi-Fi communication services, various new standards, such as 802.11ax, 802.11 ay, or Wi-Fi Aware have been established, and to secure insufficient frequency channels, a Wi-Fi communication service using a 1.2-GHz bandwidth (e.g., 5925 MHz to 7125 MHz) of the 6 GHz band is being prepared.

However, part of the 6 GHz band is already used in some regions of some countries for the purpose of power plant facility management and so on. Therefore, an elaborate use plan for the 6 GHz band is being sought. For example, the 6 GHz band may be subdivided to differently define different allowed transmission power strengths for the subdivided bands or to apply an automated frequency coordination (AFC) operation.

To reduce the impact on the environment in which the 6 GHz band is already used, a different allowed transmission power strength may be defined depending on an environment (e.g., indoors or outdoors) in which the Wi-Fi communication service is used. For example, when the Wi-Fi service is used indoors, the allowed transmission power strength may be limited to 250 mW because the existing environment is not significantly affected. On the other hand, when the Wi-Fi service is used outdoors (including the inside of a transportation means), the allowed transmission power strength may be limited to a very low power (VLP) strength (e.g., 25 mW or less). However, when the transmission power of the Wi-Fi communication service is limited to ultra-low power, the speed of data transmission and/or reception may be limited.

In addition, since the Wi-Fi communication service using the 6 GHz band uses the bandwidth of 1.2 GHz, wider than 72 MHz and 670 MHz, a relatively long scan time may be required during scanning to establish a communication connection.

an electronic device that determines a different allowed transmission power strength for a Wi-Fi communication service according to whether a function based on a specific communication scheme is executed.

Another aspect of the disclosure is to provide an electronic device that determines a different frequency band for scanning according to whether a function based on a specific communication scheme is executed, when scanning an external electronic device.

In accordance with an aspect of the disclosure, an electronic device may include a first communication circuit supporting a first communication scheme, and a second communication circuit supporting a second communication scheme, and configured to transmit a signal having a strength equal to or less than a first threshold in at least one first band, and transmit a signal having a strength equal to or less than a second threshold in at least one second band. The first communication circuit may be configured to establish a first connection with an external electronic device based on the first communication scheme, the second communication circuit may be configured to transmit the signal having the strength equal to or less than the first threshold based on execution of a first function based on the first connection, and the first threshold may be less than the second threshold.

In accordance with another aspect of the disclosure, a method of controlling an electronic device may include establishing a first connection with an external electronic device based on a first communication scheme, using a first communication circuit, and transmitting a signal having a strength equal to or less than a first threshold based on execution of a first function based on the first connection, using a second communication circuit. The second communication circuit may support the second communication scheme, and may be configured to transmit the signal having the strength equal to or less than the first threshold in at least one first band, and transmit a signal having a strength equal to or less than a second threshold in at least one second band. The first threshold may be less than the second threshold.

In accordance with another aspect of the disclosure, an electronic device may include a first communication circuit supporting a first communication scheme, and a second communication circuit supporting a second communication scheme. The first communication circuit may be configured to establish a first connection with an external electronic device based on the first communication scheme. The second communication circuit may be configured to transmit a signal having a strength equal to or less than a first threshold in a first band, based on a first function based on the first connection being executed, and transmit a signal having a strength equal to or less than a second threshold in a second band, based on the first function based on the first connection not being executed. The first band may be different from the second band, and the first threshold may be less than the second threshold.

An electronic device according to various embodiments of the disclosure may determine a different allowed transmission power strength for a Wi-Fi communication service according to whether a function based on a specific communication scheme is executed, thereby restricting the speed of data transmission and/or reception under a specific condition.

An electronic device according to various embodiments of the disclosure may determine a different band to be scanned according to whether a function based on a specific communication scheme is executed, and thus rapidly scan an external electronic device.

Various effects achieved by the disclosure are not limited to the above ones.

BRIEF DESCRIPTION OF THE DRAWINGS

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
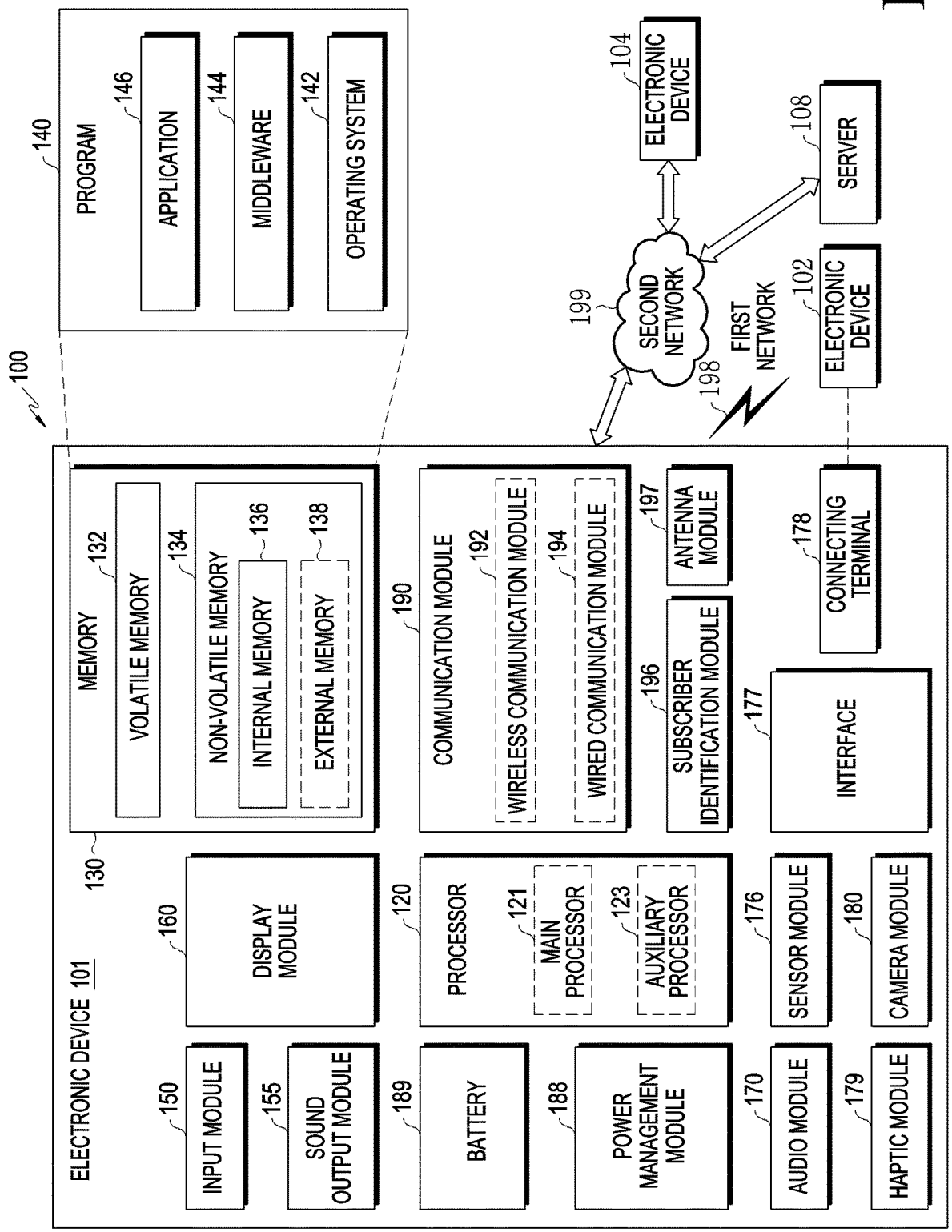
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
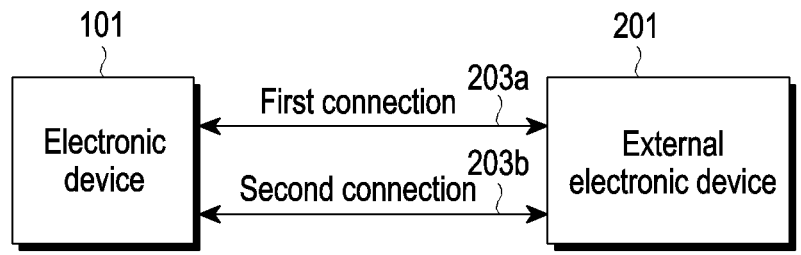
FIG. 2 is a block diagram illustrating a plurality of connections established between an electronic device and an external electronic device according to various embodiments of the disclosure.

FIG. 2 is a block diagram illustrating a plurality of connections established between the electronic device 101 and an external electronic device 201 (e.g., the external electronic device 102 or the external electronic device 104 of FIG. 1) according to an embodiment of the disclosure.

Referring to FIG. 2, the electronic device 101 may be connected to the external electronic device 201 based on a plurality of different communication schemes. For example, the electronic device 101 may establish a first connection 203*a* with the external electronic device 201 based on a first communication scheme, and a second connection 203*b* with the external electronic device 201 based on a second communication scheme. For example, the first and second communication schemes may include, but not limited to, at least one of a Bluetooth communication scheme, a Bluetooth low energy (BLE) communication scheme, an ultra-wideband (UWB) communication scheme, a Wi-Fi communication scheme, a Wi-Fi direct communication scheme, or a mobile communication scheme (e.g., fifth-generation (5G) communication or long term evolution (LTE) communication). For example, the first and second connections 203*a* and 203*b* may be the first network 198 or the second network 199 of FIG. 1.

According to various embodiments of the disclosure, the electronic device 101 and the external electronic device 201 may execute different functions using the established first connection 203*a* and the established second connection 203*b*, respectively. For example, the execution of the functions using the first and second connections 203*a* and 203*b* may include at least one of execution of applications using the first and second connections 203*a* and 203*b* or transmission and/or reception of data via the first and second connections 203*a* and 203*b* in the electronic device 101 and/or the external electronic device 201.

According to various embodiments of the disclosure, the first communication scheme and the second communication scheme may have different characteristics. For example, the first and second communication schemes may differ in at least one of an available data transmission/reception range, a data transmission/reception speed, the type of transmittable/receivable data, a used frequency band, or whether it is possible to establish a secure channel.

While the electronic device 101 and the external electronic device 201 are shown as connected based on two communication schemes in this drawing, for convenience of description, they may also be connected based on three or more different communication schemes.

Figure 3A:
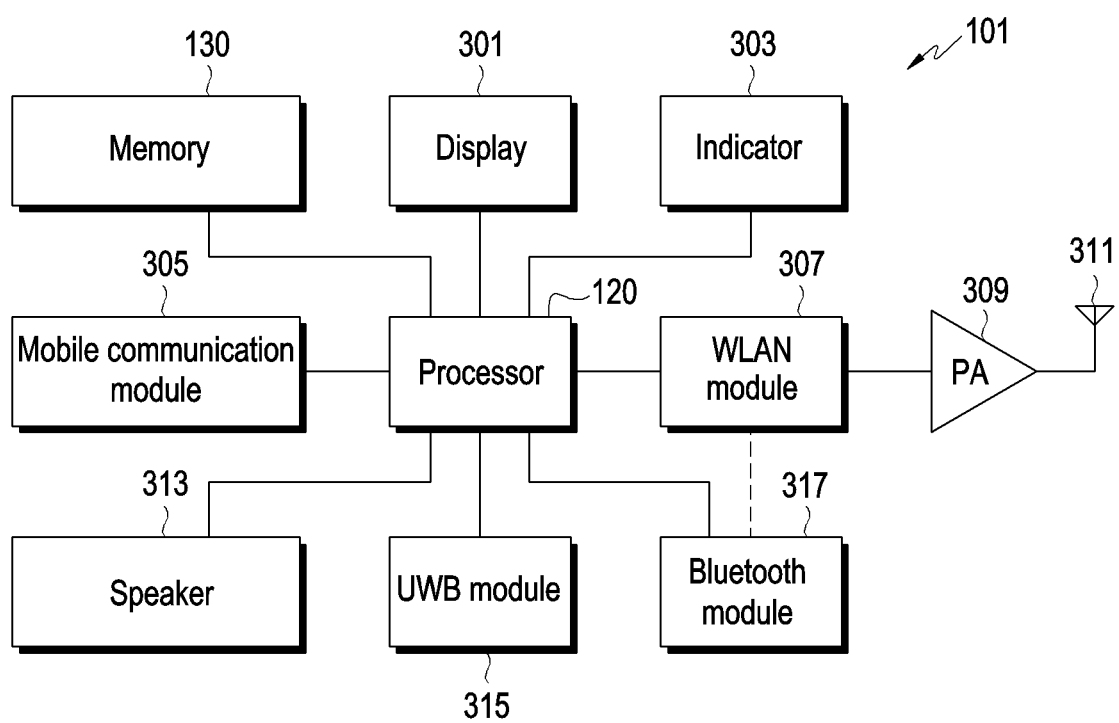
FIG. 3A is a block diagram illustrating components of an electronic device according to various embodiments of the disclosure.

FIG. 3A is a block diagram illustrating components of an electronic device according to an embodiment of the disclosure.

Referring to FIG. 3A, the electronic device 101 may include at least one of the memory 130, a display 301 (e.g., the display device 160 of FIG. 1), an indicator 303, a mobile communication module 305 (e.g., the wireless communication module 192 of FIG. 1), the processor 120, a wireless local area network (WLAN) module 307 (e.g., the wireless communication module 192 of FIG. 1), a power amplifier (PA) 309, an antenna 311 (e.g., the antenna module 197 of FIG. 1), a speaker 313 (e.g., the sound output device 155 of FIG. 1), a UWB module 315 (e.g., the wireless communication module 192 of FIG. 1), or a Bluetooth module 317 (e.g., the wireless communication module 192 of FIG. 1).

According to various embodiments of the disclosure, the memory 130 may store various data used by at least one component of the electronic device 101. According to various embodiments of the disclosure, the memory 130 may include at least one of a volatile memory (e.g., a random access memory (RAM)) or a non-volatile memory (e.g., a storage). According to various embodiments of the disclosure, at least part of the memory 130 may be included in communication modules (e.g., the mobile communication module 305, the WLAN module 307, the UWB module 315, or the Bluetooth module 317).

According to various embodiments of the disclosure, the display 301 may visually provide information to the outside of the electronic device 101.

According to various embodiments of the disclosure, the indicator 303 may visually provide information to the outside of the electronic device 101. For example, according to various embodiments of the disclosure, the indicator 303 may include a light-emitting diode (LED) that may visually provide a notification of occurrence of an event in the electronic device 101. According to various embodiments of the disclosure, the indicator 303 may provide the notification of occurrence of an event in a haptic manner, such as vibration.

According to various embodiments of the disclosure, the processor 120 may provide overall control to operations performed by the electronic device 101 or perform the operations.

According to various embodiments of the disclosure, the mobile communication module 305 may transmit data to and/or receive data from a base station (BS) by supporting 5G communication or LTE communication. The mobile communication module 305 may be configured in the form of one chipset or separate chipsets of a 5G module supporting 5G communication and an LTE module supporting LTE communication.

According to various embodiments of the disclosure, the WLAN module 307 may transmit data to or receive data from an external electronic device (e.g., the external electronic device 201 of FIG. 2) directly or via an access point (AP) by supporting Wi-Fi communication. According to various embodiments of the disclosure, the WLAN module 307 may support a band having a center frequency of 2.4 GHz, 5 GHz, or 6 GHz or other bands. According to various embodiments of the disclosure, the WLAN module 307 may be configured in the form of one chipset or package supporting various bands or in the form of a plurality of chipsets or packages (e.g., a plurality of WLAN modules) supporting individual bands, respectively. According to various embodiments of the disclosure, the WLAN module 307 may be electrically connected to the Bluetooth module 317 to transmit data to and/or receive data from the Bluetooth module 317. According to various embodiments of the disclosure, while not shown, the WLAN module 307 may be electrically connected to at least one of the UWB module 315 or the mobile communication module 305 to transmit data to and/or receive data from the at least one of the UWB module 315 or the mobile communication module 305. According to various embodiments of the disclosure, the WLAN module 307 may include a CP (e.g., the auxiliary processor 123 of FIG. 1) to perform at least one of application execution, data transmission and/or reception, or data processing. According to various embodiments of the disclosure, when the WLAN module 307 is configured with a plurality of WLAN modules, the WLAN modules may include individual CPs respectively or one CP for controlling the operation of the plurality of WLAN modules.

According to various embodiments of the disclosure, the PA 309 may amplify an electrical signal received from the WLAN module 307 under the control of the processor 120 or the WLAN module 307. According to various embodiments of the disclosure, the PA 309 may include at least one of at least one amplifier, at least one matching circuit, or at least one capacitor. According to various embodiments of the disclosure, a plurality of PAs 309 may be provided and be connected to the plurality of WLAN modules 307 supporting individual bands (e.g., bands corresponding to 2.4 GHz, 5 GHz, and 6 GHz), respectively. For example, a first PA may be connected to a first WLAN module supporting the band corresponding to 2.4 GHz, a second PA may be connected to a second WLAN module supporting the band corresponding to 5 GHz, and a third PA may be connected to a third WLAN module supporting the band corresponding to 6 GHz.

According to various embodiments of the disclosure, the antenna 311 may transmit or receive a signal or power to or from the outside (e.g., an external electronic device). For example, the antenna 311 may transmit a signal or power received from the PA 309 to the outside. According to various embodiments of the disclosure, a plurality of antennas 311 may be provided.

According to various embodiments of the disclosure, the speaker 313 may output a sound signal to the outside of the electronic device 101.

According to various embodiments of the disclosure, the UWB module 315 may support UWB communication using a wide frequency band (e.g., 3.1 GHz to 10.6 GHz) to transmit data to and/or receive data from an external electronic device (e.g., the external electronic device 201 of FIG. 2). According to various embodiments of the disclosure, the UWB module 315 may be connected to the external electronic device (e.g., the external electronic device 201 of FIG. 2) by establishing a secure channel.

According to various embodiments of the disclosure, the Bluetooth module 317 may support Bluetooth communication and/or BLE communication (hereinafter referred to as Bluetooth communication) to transmit data to and/or receive data from an external electronic device (e.g., the external electronic device 201 of FIG. 2). For example, the transmitted and/or received data may include a Bluetooth profile. According to various embodiments of the disclosure, the Bluetooth profile may be used for Bluetooth communication connection and/or application execution.

Figure 3B:
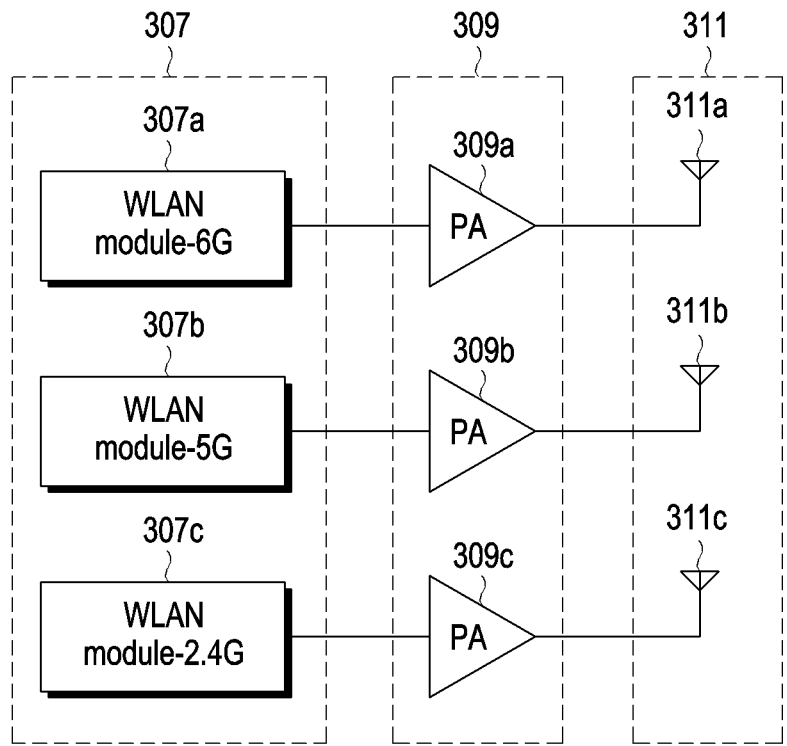
FIG. 3B is a diagram illustrating a case of a plurality of wireless local area network (WLAN) modules, a plurality of power amplifiers (Pas), and a plurality of antennas according to an embodiment of the disclosure.

FIG. 3B is a diagram illustrating a case of a plurality of WLAN modules 307, a plurality of PAs 309, and a plurality of antennas 311 according to an embodiment of the disclosure.

Referring to FIG. 3B, the WLAN module 307 may be configured with a plurality of WLAN modules supporting individual bands. For example, the WLAN module 307 may include at least one of a WLAN module-6G 307a supporting Wi-Fi communication in the 6 GHz band, a WLAN module-5G 307b supporting Wi-Fi communication in the 5 GHz band, or a WLAN module-2.4G 307c supporting communication Wi-Fi communication in the 2.4 GHz band.

According to various embodiments of the disclosure, the PA 309 may include a plurality of PAs 309a, 309b, and 309c. The plurality of PAs 309a, 309b, and 309c may amplify electrical signals received from the WLAN modules 307a, 307b, and 307c connected to them, respectively and input the amplified electrical signals to antennas 311a, 311b, and 311c connected to them, respectively. For example, the PA 309a may amplify an electrical signal received from the connected WLAN module-6G 307a and input the amplified electrical signal to the connected antenna 311a. The PA 309b may amplify the electrical signal received from the connected WLAN module-5G 307b and input the amplified electrical signal to the connected antenna 311b. The PA 309c may amplify the electrical signal received from the connected WLAN module-2.4G 307c and input the amplified electrical signal to the connected antenna 311c. According to various embodiments of the disclosure, the PA 309 may include as many PAs as or PAs fewer than the number of the plurality of WLAN modules. For example, when a switching element (not shown) is included between the plurality of WLAN modules and the PA 309, the PA 309 may be connected to a WLAN module in use among the plurality of WLAN modules. In this case, the number of PAs 309 may be less than the number of the plurality of WLAN modules.

According to various embodiments of the disclosure, the antenna 311 may include the plurality of antennas 311a, 311b, and 311c. According to various embodiments of the disclosure, each of the plurality of antennas 311a, 311b, and 311c may be configured to transmit and/or receive a signal or power in a frequency band supported by a WLAN module connected to the antenna. For example, the antenna 311a may be configured to transmit and/or receive a signal or power in the frequency band supported by the connected WLAN module-6G 307a. The antenna 311b may be configured to transmit and/or receive a signal or power in the frequency band supported by the connected WLAN module-5G 307b. The antenna 311c may be configured to transmit and/or receive a signal or power in the frequency band supported by the connected WLAN module-2.4G 307c.

Figure 3C:
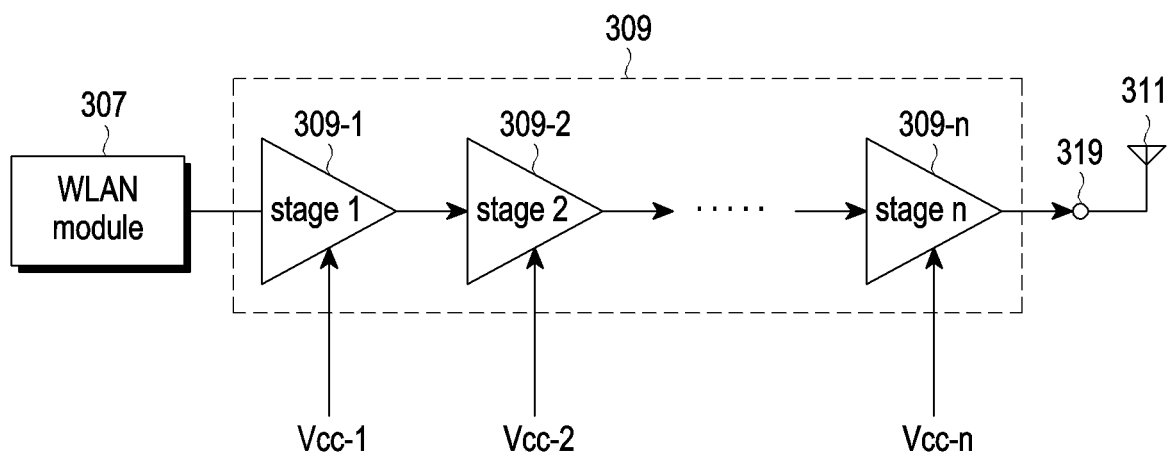
FIG. 3C is a diagram illustrating a method of adjusting strength of an electrical signal output from a PA according to various embodiments of the disclosure.

FIG. 3C is a diagram illustrating a method of adjusting strength of an electrical signal output from a PA according to an embodiment of the disclosure.

Referring to FIG. 3C, the PA 309 may include a plurality of amplifiers 309-1 and 309-2 to 309-n. According to various embodiments of the disclosure, an electrical signal received from the WLAN module 307 may be amplified by as much as a gain value of each amplifier and output to an output terminal 319 of the PA 309, whenever it passes through the amplifiers (e.g., stage 1 to stage n in FIG. 3C).

According to various embodiments of the disclosure, the processor (e.g., the processor 120 of FIG. 1) or the WLAN module 307 may determine the strength (e.g., the strength of power) of the electrical signal output from the PA 309. For example, the processor (e.g., the processor 120 of FIG. 1) or the WLAN module 307 may adjust the strength of the electrical signal output from the PA 309 by adjusting direct current (DC) power to be applied to biases Vcc-1 and Vcc-2 to Vcc-n of the plurality of amplifiers 309-1 and 309-2 to 309-n. According to various embodiments of the disclosure, the processor (e.g., the processor 120 of FIG. 1) or the WLAN module 307 may adjust the strength of the electrical signal output from the PA 309 by adjusting the number of activated amplifiers among the plurality of amplifiers 309-1 and 309-2 to 309-n.

According to various embodiments of the disclosure, the PA 309 may further include at least one matching circuit (not shown). The at least one matching circuit (not shown) may be included in the input terminal and/or output terminal of the PA 309 to perform impedance matching on the electrical signal output from the PA 309 (e.g., the amplifier 309-n). While not shown, a low noise amplifier (LNA) for reception may be connected to the antenna 311 or another antenna, and at least one matching circuit (not shown) may also be connected to the LNA. The at least one matching circuit (not shown) connected to the LNA may perform impedance matching on the electrical signal received from the WLAN module 307.

According to various embodiments of the disclosure, the PA 309 may further include an active bias (not shown). The processor (e.g., the processor 120 of FIG. 1) or the WLAN module 307 may transmit a control signal to the active bias (not shown), and control the active bias (not shown) to determine DC power to be applied to each of the biases Vcc-1 and Vcc-2 to Vcc-n according to the control signal and apply the determined DC power. The strength of the electrical signal output from the PA 309 may be adaptively adjusted through this operation.

Figure 4:
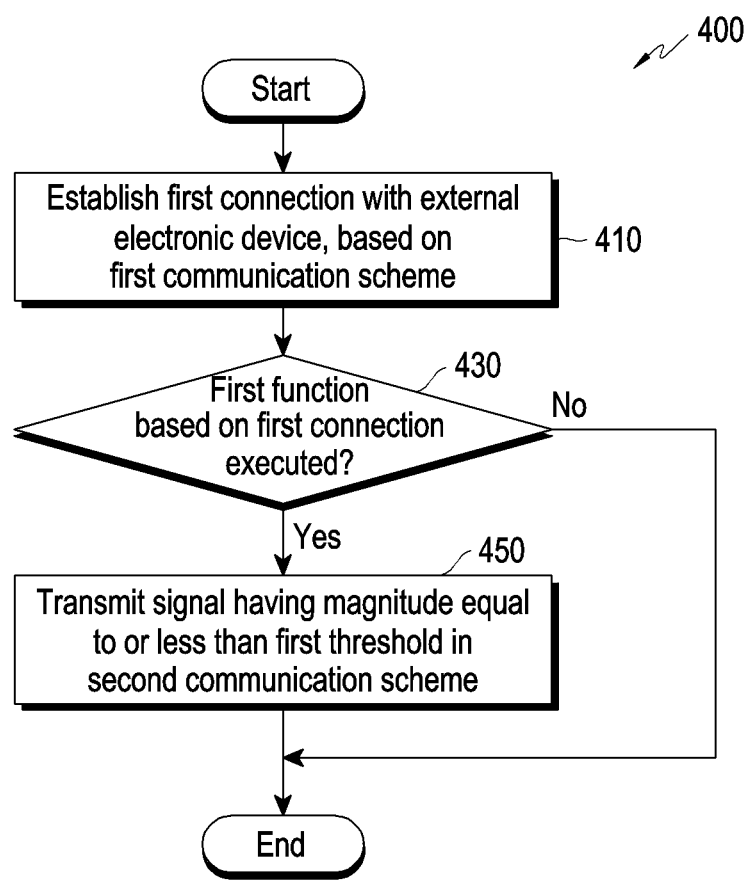
FIG. 4 is a flowchart illustrating a method of transmitting a signal having a strength equal to or less than a first threshold in an electronic device according to an embodiment of the disclosure.

FIG. 4 is a flowchart 400 illustrating a method of transmitting a signal having a strength equal to or less than a first threshold by an electronic device according to an embodiment of the disclosure.

Referring to FIG. 4, in operation 410, the electronic device 101 may establish a first connection (e.g., the first connection 203a of FIG. 2) with an external electronic device (e.g., the external electronic device 201 of FIG. 2) based on a first communication scheme.

According to various embodiments of the disclosure, a first communication circuit (e.g., the UWB module 315 or the Bluetooth module 317 of FIG. 3A) may detect the external electronic device (e.g., the external electronic device 201 of FIG. 2) using a signal (e.g., a UWB signal or BLE signal) of the first communication scheme (e.g., a UWB communication scheme or a Bluetooth communication scheme). According to various embodiments of the disclosure, the first communication circuit (e.g., the UWB module 315 or the Bluetooth module 317 of FIG. 3A) may transmit the first signal (e.g., the UWB signal or Bluetooth signal) of the first communication scheme (e.g., the UWB communication scheme or the Bluetooth communication scheme). For example, the transmission of the first signal of the first communication scheme may be performed by broadcast, multicast, or unicast. According to various embodiments of the disclosure, upon receipt of a first response signal corresponding to the transmitted first signal from the external electronic device (e.g., the external electronic device 201 of FIG. 2), the first communication circuit (e.g., the UWB module 315 or the Bluetooth module 317 of FIG. 3A) may detect the external electronic device (e.g., the external electronic device 201 of FIG. 2). According to various embodiments of the disclosure, upon receipt of a periodically transmitted second signal (e.g., a UWB signal or BLE signal) of the first communication scheme (e.g., the UWB communication scheme or the Bluetooth communication scheme) from the external electronic device (e.g., the external electronic device 201 in FIG. 2), the first communication circuit (e.g., the UWB module 315 or the Bluetooth module 317 of FIG. 3A) may detect the external electronic device (e.g., the external electronic device 201 of FIG. 2).

According to various embodiments of the disclosure, upon detection of the external electronic device (e.g., When the external electronic device 201 of FIG. 2), the first communication circuit (e.g., the UWB module 315 or the Bluetooth module 317 of FIG. 3A) or the processor (e.g., the processor 120 of FIG. 1) may activate a function of the first communication circuit (e.g., the UWB module 315 or the Bluetooth module 317 of FIG. 3A).

According to various embodiments of the disclosure, the first communication circuit (e.g., the UWB module 315 or the Bluetooth module 317 of FIG. 3A) may establish the first connection (e.g., the first connection 203a of FIG. 2) with the external electronic device (e.g., the external electronic device 201 of FIG. 2) based on at least one of device-related information or communication connection information about the external electronic device (e.g., the external electronic device 201 of FIG. 2) included in the received first response signal or the received second signal, or information about a previous connection to the external electronic device (e.g., the external electronic device 201 of FIG. 2) stored in the memory (e.g., the memory 130 of FIG. 1), corresponding to the external electronic device (e.g., the external electronic device 201 of FIG. 2). For example, the device-related information may include at least one of a model name, a manufacturer, or a medium access control (MAC) address. For example, the communication connection information, which is information required to establish the first communication (e.g., the first communication 203a of FIG. 2) with the external electronic device (e.g., the external electronic device 201 of FIG. 2), may include a Bluetooth profile, when the first communication scheme is the Bluetooth communication scheme. For example, the Bluetooth profile may include, but not limited to, at least one of a carkit profile, a hands free profile (HFP), an advanced audio distribution profile (A2DP), or a serial port profile (SPP). For example, the information about the previous connection to the external electronic device (e.g., the external electronic device 201 of FIG. 2) may include communication connection information required to establish the first communication (e.g., the first communication 203a of FIG. 2) with the external electronic device (e.g., the external electronic device 201 of FIG. 2), and may be identified based on the device-related information about the external electronic device (e.g., the external electronic device 201 of FIG. 2). According to various embodiments of the disclosure, the first communication circuit (e.g., the UWB module 315 or the Bluetooth module 317 of FIG. 3A) may establish a secure channel with the external electronic device (e.g., the external electronic device of FIG. 2). According to various embodiments of the disclosure, the first communication circuit (e.g., the UWB module 315 or the Bluetooth module 317 of FIG. 3A) may establish the first connection (e.g., the first connection 203a of FIG. 2) with the external electronic device (e.g., the external electronic device 201 of FIG. 2) based on a user input. According to various embodiments of the disclosure, the first communication circuit (e.g., the UWB module 315 or the Bluetooth module 317 of FIG. 3A) or the processor (e.g., the processor 120 of FIG. 1) may execute a specific application based on the execution of the specific application, or the first communication circuit (e.g., the UWB module 315 or the Bluetooth module 317 of FIG. 3A) may establish the first connection (e.g., the first connection 203a of FIG. 2) of a communication scheme corresponding to the specific application, based on the execution of the specific application.

According to various embodiments of the disclosure, in operation 430, the electronic device 101 may identify whether a first function based on the first connection (e.g., the first connection 203a of FIG. 2) has been executed. For example, the first function may include at least one of data transmission and/or reception via the established first connection (e.g., the first connection 203a of FIG. 2), or execution of an application used for the data transmission and/or reception via the established first connection (e.g., the first connection 203a of FIG. 2). According to various embodiments of the disclosure, the first function may be executed by the processor (e.g., the processor 120 of FIG. 1), the first communication circuit (e.g., the UWB module 315 or the Bluetooth module 317 of FIG. 3A), or the external electronic device 201.

According to various embodiments of the disclosure, when the first function is executed, a second communication circuit (e.g., the WLAN module 307 of FIG. 3A) may receive information indicating whether the first function has been executed (in other words, execution information about the first function) from the processor (e.g., the processor 120 of FIG. 1) or the first communication circuit (e.g., the UWB module 315 or the Bluetooth module 317 of FIG. 3A). According to various embodiments of the disclosure, when the first function has been executed in the electronic device 101, the second communication circuit (e.g., the WLAN module 307 of FIG. 3A) may receive the information indicating whether the first function has been executed (in other words, the execution information about the first function) from the external electronic device 201. The information from the external electronic device 201 may be transmitted to the second communication circuit (e.g., the WLAN module 307 of FIG. 3A) directly through, for example, the first communication circuit (e.g., the UWB module 315 or the Bluetooth module 317 of FIG. 3A) or to the second communication circuit (e.g., the WLAN module 307 of FIG. 3A) through the first communication circuit (e.g., the UWB module 315 or the Bluetooth module 317 of FIG. 3A) and the processor (e.g., the processor 120 of FIG. 1).

According to various embodiments of the disclosure, the second communication circuit (e.g., the WLAN module 307 of FIG. 3A) may identify whether the first function based on the first connection (e.g., the first connection 203a of FIG. 2) has been executed, based on the received information indicating whether the first function has been executed. According to various embodiments of the disclosure, upon receipt of information indicating that the first function has been executed from the processor (e.g., the processor 120 of FIG. 1), the first communication circuit (e.g., the UWB module of FIG. 3A), or the external electronic device (e.g., the external electronic device 201 of FIG. 2), the second communication circuit (e.g., the WLAN module 307 of FIG. 3A) may identify that the first function has been executed. According to various embodiments of the disclosure, upon receipt of information indicating that the first function has not been executed from the processor (e.g., the processor 120 of FIG. 1) from the first communication circuit (e.g., the UWB module of FIG. 3A), or the external electronic device (e.g., the external electronic device 201 of FIG. 2), or when failing to receive the information indicating whether the first function has been executed, the second communication circuit (e.g., the WLAN module 307 of FIG. 3A) may identify that the first function has not been executed.

According to various embodiments of the disclosure, when identifying that the first function based on the first connection (e.g., the first connection 203a of FIG. 2) has been executed, the electronic device 101 may transmit a signal having a strength (in other words, very low power (VLP)) equal to or less than the first threshold of a second communication scheme (e.g., Wi-Fi communication) in operation 450. According to various embodiments of the disclosure, the second communication circuit (e.g., the WLAN module 307 of FIG. 3A) may be configured to transmit at least one of a signal having a strength equal to or less than the first threshold or a signal having a strength equal to or less than a second threshold. According to various embodiments of the disclosure, when identifying that the first function has been executed, the processor (e.g., the processor 120 of FIG. 1) or the second communication circuit (e.g., the WLAN module 307 of FIG. 3A) may identify the first threshold. According to various embodiments of the disclosure, the first threshold may be set differently according to the type of the electronic device 101. For example, when the electronic device 101 is a mobile phone, the first threshold may be set to about 25 mW. For example, when the electronic device 101 is an augmented reality (AR)/virtual reality (VR) device (e.g., AR/VR glasses), the first threshold may be set to about 13 mW. According to various embodiments of the disclosure, the second communication circuit (e.g., the WLAN module 307 of FIG. 3A) may cause, for example, an electrical signal (e.g., power) output from a PA (e.g., the PA 309 of FIG. 3A) to an output terminal (e.g., the output terminal of FIG. 3A) to have a strength equal to or less than the first threshold, so that the signal having the strength equal to or less than the first threshold may be transmitted. According to various embodiments of the disclosure, the first threshold may be determined based on an equivalent isotropically radiated power (EIRP). For example, the first threshold may be about 14 dBm, which is an EIRP corresponding to about 25 mW of transmission power. According to various embodiments of the disclosure, the first threshold may be determined based on an EIRP spectral density limitation. For example, the first threshold may be about −5 dBm/MHz. According to various embodiments of the disclosure, identifying a signal having a strength equal to or less than the first threshold may be described as activating the second communication circuit (e.g., the WLAN module 307 of FIG. 3A) with the first threshold, activating the second communication circuit (e.g., the WLAN module 307 in FIG. 3A) with a strength equal to or less than the first threshold, or activating the second communication circuit (e.g., the WLAN module 307 of FIG. 3A) in VLP mode. According to various embodiments of the disclosure, the first threshold may be different from a transmittable power strength (e.g., the second threshold) in a general Wi-Fi service. According to various embodiments of the disclosure, the first threshold may be smaller than the transmittable power strength (e.g., the second threshold) of the general Wi-Fi service. For example, the second threshold may be set to about 250 mW, greater than the first threshold. According to various embodiments of the disclosure, the second communication circuit (e.g., the WLAN module 307 of FIG. 3A) may cause, for example, an electrical signal (e.g., power) output from the PA (e.g., the PA 309 of FIG. 3A) to the output terminal (e.g., the output terminal of FIG. 3A) to have a strength equal to or less than the second threshold, so that the signal having the strength equal to or less than the second threshold may be transmitted. According to various embodiments of the disclosure, identifying a signal having a strength equal to or less than the second threshold may be described as activating the second communication circuit (e.g., the WLAN module 307 of FIG. 3A) with the second threshold, activating the second communication circuit (e.g., the WLAN module 307 in FIG. 3A) with a strength equal to or less than the second threshold, or activating the second communication circuit (e.g., the WLAN module 307 of FIG. 3A) in general Wi-Fi mode. According to various embodiments of the disclosure, upon activation of the second communication circuit (e.g., the WLAN module 307 in FIG. 3A) with the first connection (e.g., the first connection 203a of FIG. 2) not established or the first function not executed, the second communication circuit (e.g., the WLAN module 307 in FIG. 3A) may be configured to be activated in the general Wi-Fi mode and transmit a signal having a strength equal to or less than the second threshold.

According to various embodiments of the disclosure, when transmitting data to the electronic device 101, the external electronic device (e.g., the external electronic device 201 of FIG. 2) may transmit the data to the electronic device 101 via the second connection (e.g., the second connection 203b of FIG. 2) using a signal having a strength equal to or less than the first threshold by receiving information about the first threshold from the electronic device 101 or identifying the frequency band of the established second connection (e.g., the second connection 203b of FIG. 2).

According to various embodiments of the disclosure, the electronic device 101 may establish a connection (e.g., the second connection 203b of FIG. 2) with the external electronic device (e.g., the external electronic device 201 of FIG. 2) or transmit and/or receive data via the established connection (e.g., the second connection 203b of FIG. 2), using the signal having the strength equal to or less than the first threshold or the signal having the strength equal to or less than the second threshold.

According to various embodiments of the disclosure, when the electronic device 101 is located inside the external electronic device (e.g., the external electronic device 201 of FIG. 2) or in a short range (e.g., within about 3 m or 10 m) from the external electronic device (e.g., the external electronic device 201 of FIG. 2), the first connection (e.g., the first connection 203a of FIG. 1) of the first communication scheme (e.g., the Bluetooth communication scheme or the UWB communication scheme), which is a short-range communication scheme relative to the second communication scheme (e.g., Wi-Fi communication), and/or execution of the function based on the first connection (e.g., the first connection 203a of FIG. 1) may be identified. Therefore, when the electronic device 101 is located inside the external electronic device (e.g., the external electronic device 201 of FIG. 2) or in the short range (e.g., within about 3 m or 10 m) from the external electronic device (e.g., the external electronic device 201 of FIG. 2), the electronic device 101 may perform establishment of the second connection (e.g., the second connection 203b of FIG. 2) and/or data transmission and/or reception via the second connection (e.g., the second connection 203b of FIG. 2), with low power (in other words, VLP). Accordingly, the electronic device 101 may reduce power consumption based on the second connection (e.g., the second connection 203b of FIG. 2) and the impact on the existing environment using the 6 GHz band. In addition, the electronic device 101 may provide convenience to the user by satisfying the user's intention to execute functions based on a plurality of communication connections to the external electronic device (e.g., the external electronic device 201 of FIG. 2). In addition, the electronic device 101 may set the first threshold differently based on the type of the electronic device 101 to satisfy a different transmission power requirement according to the type of the electronic device 101 during establishment of the second connection (e.g., the second connection 203*b* of FIG. 2) and/or data transmission and/or reception via the second connection (e.g., the second connection 203*b* of FIG. 2).

Figure 5:
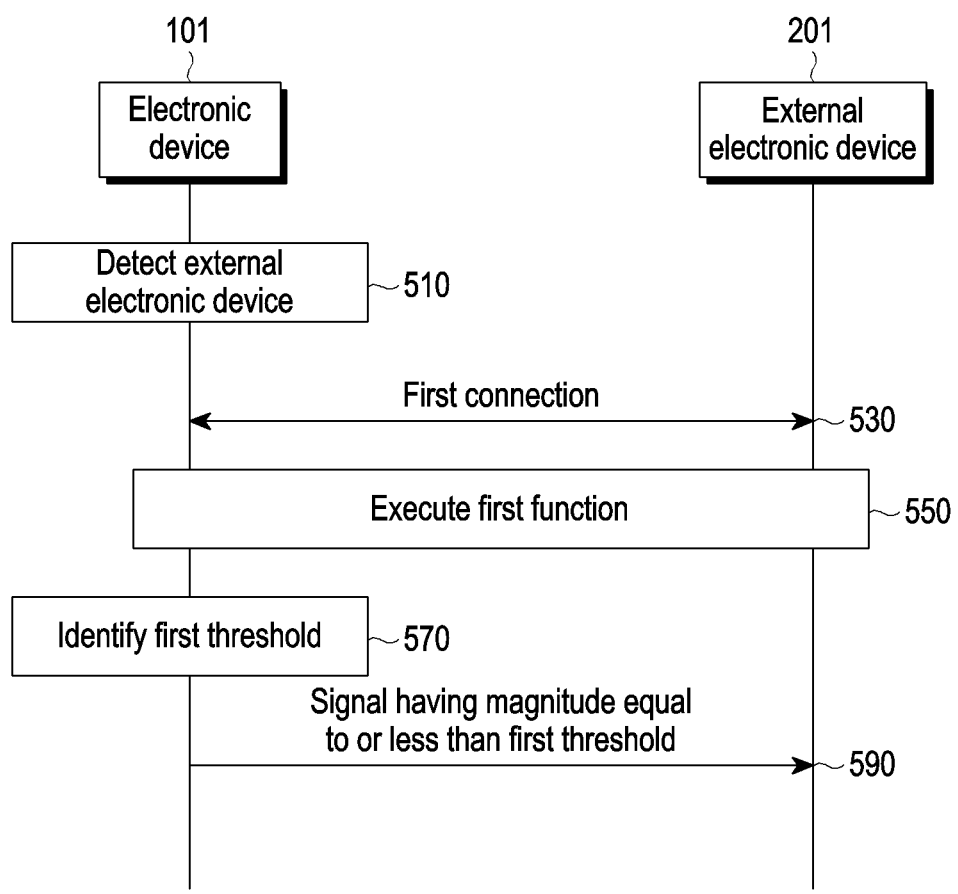
FIG. 5 is a flowchart illustrating a method of transmitting a signal having a strength equal to or less than a first threshold in an electronic device according to an embodiment of the disclosure.

FIG. 5 is a flowchart 500 illustrating a method of transmitting a signal having a strength equal to or less than a first threshold by the electronic device 101 according to an embodiment of the disclosure.

Referring to FIG. 5, the electronic device 101 may detect the external electronic device 201 in operation 510. For example, the electronic device 101 may detect the external electronic device 201 based on a first communication scheme (e.g., the UWB communication scheme or the Bluetooth communication scheme) through which a communication connection is to be established.

According to various embodiments of the disclosure, in operation 530, the electronic device 101 may establish a first connection (e.g., the first connection 203*a* of FIG. 2) with the external electronic device 201. According to various embodiments of the disclosure, the first connection (e.g., the first connection 203*a* of FIG. 2) may be established based on the first communication scheme (e.g., the UWB communication scheme or the Bluetooth communication scheme).

According to various embodiments of the disclosure, the electronic device 101 and the external electronic device 201 may execute a first function in operation 550. For example, the first function may include at least one of data transmission and/or reception via the established first connection (e.g., the first connection 203*a* of FIG. 2) or execution of an application used for the data transmission and/or reception via the established first connection (e.g., the first connection 203*a* of FIG. 2).

According to various embodiments of the disclosure, when the first communication scheme is the Bluetooth communication scheme, the first communication circuit (e.g., the UWB module 315 or the Bluetooth module 317 of FIG. 3A) or the processor (e.g., the processor 120 of FIG. 1) of the electronic device 101 may execute the first function using at least one of a Bluetooth profile received from the external electronic device 201 or a Bluetooth profile stored in the memory (e.g., the memory 130 of FIG. 1). According to various embodiments of the disclosure, the first function may include at least one of transmission and/or reception of data related to the Bluetooth profile or execution of a first application related to the Bluetooth profile. For example, the data related to the Bluetooth profile may include call-related data, and may be transmitted and/or received using an HFP profile. For example, the first application related to the Bluetooth profile may include a call application related to the HFP profile. According to various embodiments of the disclosure, when the first communication scheme is the UWB communication scheme, the first communication circuit (e.g., the UWB module 315 or the Bluetooth module 317 of FIG. 3A) or the processor (e.g., the processor 120 of FIG. 1) of the electronic device 101 may execute the first function (e.g., a vehicle unlocking function), using control information (e.g., vehicle control information) corresponding to the external electronic device (e.g., the external electronic device 201 of FIG. 2) stored in the memory (e.g., the memory 130 of FIG. 1).

According to various embodiments of the disclosure, when the first communication scheme is the Bluetooth communication scheme, the external electronic device 201 may execute the first function using at least one of the Bluetooth profile received from the electronic device 101 or the Bluetooth profile stored in memory of the external electronic device 201. For example, the first function may include at least one of transmission and/or reception of data related to the Bluetooth profile, output of the received data related to the Bluetooth profile (e.g., through a speaker or display of the external electronic device), and/or execution of a second application, and the second application may be an application corresponding to the first application executed in the electronic device 101. According to various embodiments of the disclosure, when the first communication scheme is the UWB communication scheme, the external electronic device 201 may execute the first function (e.g., a vehicle unlocking function) using control information (e.g., vehicle control information) received from the electronic device 101.

According to various embodiments of the disclosure, in operation 570, the electronic device 101 may identify a first threshold (e.g., the first threshold of FIG. 4). According to various embodiments of the disclosure, when identifying that the first function based on the first connection (the first connection 203*a* of FIG. 2) has been executed, the electronic device 101 may identify that an environment in which the Wi-Fi communication service is to be used is outdoors (or inside a transportation means). According to various embodiments of the disclosure, when identifying that the environment in which the Wi-Fi communication service is to be used is outdoors (or inside the transportation means), the electronic device 101 may activate the second communication circuit (e.g., the WLAN module 307 of FIG. 3A) in the VLP mode. According to various embodiments of the disclosure, the first threshold may be set differently according to the type of the electronic device 101.

According to various embodiments of the disclosure, in operation 590, the electronic device 101 may transmit a signal having a strength equal to or less than the first threshold to the external electronic device 201.

Figure 6A:
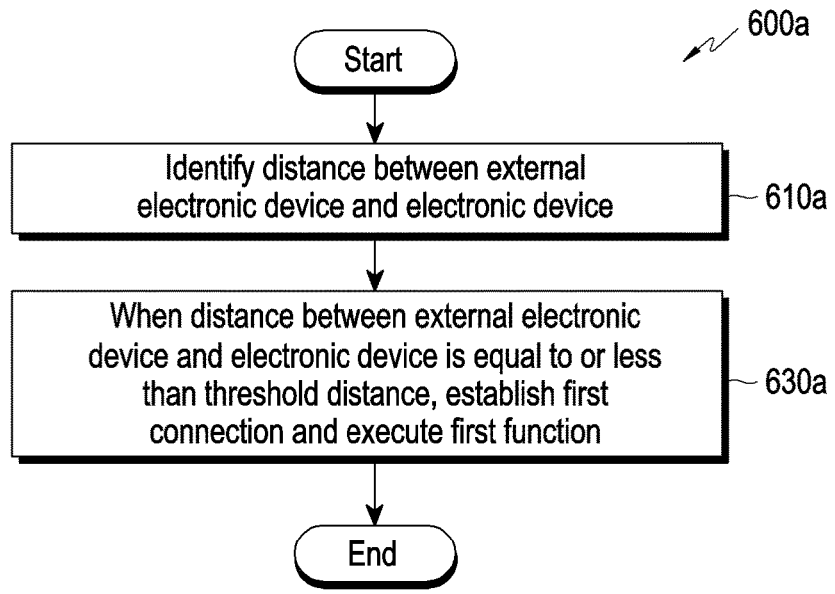
FIG. 6A is a flowchart illustrating a method of detecting an external electronic device by an electronic device according to an embodiment of the disclosure.

FIG. 6A is a flowchart 600*a* illustrating a method of detecting an external electronic device (e.g., the external electronic device 201 of FIG. 2) by an electronic device (e.g., the electronic device 101 of FIG. 1) according to an embodiment of the disclosure.

Referring to FIG. 6A, in operation 610*a*, the electronic device 101 may identify a distance between the electronic device 101 and the external electronic device (e.g., the external electronic device 201 of FIG. 2). For example, the electronic device 101 may identify the distance between the electronic device 101 and the external electronic device (e.g., the external electronic device 201 of FIG. 2) through an SS-TWR method or a DS-TWR method, using the UWB module (e.g., the UWB module 315 of FIG. 3A). In another example, the electronic device 101 may identify the distance between the electronic device 101 and the external electronic device (e.g., the external electronic device 201 of FIG. 2) based on at least one of the time of flight (ToF) of a signal, the degree of attenuation of the signal, or location information about the external electronic device (e.g., the external electronic device 201 of FIG. 2) received from the external electronic device (e.g., the external electronic device 201 of FIG. 2) or a communication BS. The method of identifying the distance between the electronic device 101 and the external electronic device (e.g., the external electronic device 201 of FIG. 2) is not limited to the above-described example.

According to various embodiments of the disclosure, in operation 630*a*, when the distance between the electronic device 101 and the external electronic device (e.g., the external electronic device 201 of FIG. 2) is equal to or less than a threshold distance, the electronic device 101 may establish a first connection (e.g., the first connection 203*a* of FIG. 2) and execute a first function. When the distance between the electronic device 101 and the external electronic device (e.g., the external electronic device 201 of FIG. 2) is equal to or less than the threshold distance, the electronic device 101 may detect the external electronic device 201 (e.g., the external electronic device 201 of FIG. 2) and establish the first connection (e.g., the first connection 203a of FIG. 2) in operation 630a. According to various embodiments of the disclosure, the threshold distance may correspond to a distance at which a signal based on the Bluetooth communication scheme is transmittable and/or receivable. For example, the threshold distance may be about 10 m. According to various embodiments of the disclosure, the threshold distance may correspond to a distance at which interference has a small effect during Wi-Fi VLP communication (in other words, transmission and/or reception of a signal having a strength equal to or less than a first threshold). For example, the threshold distance may be about 3 m, and may be preset.

Figure 6B:
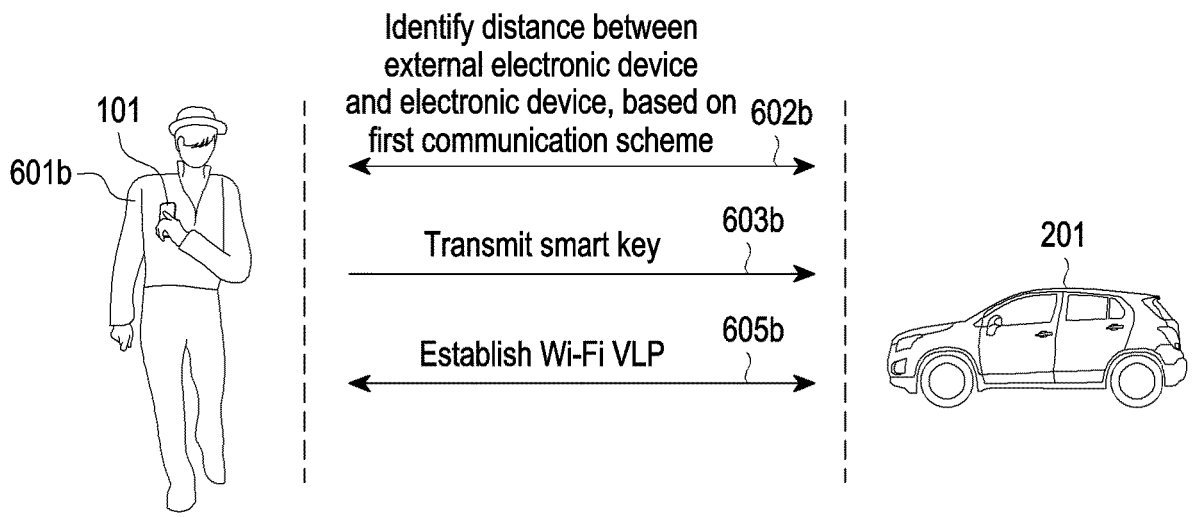
FIG. 6B is a diagram illustrating a method of establishing a second connection based on a distance to an external electronic device by an electronic device according to an embodiment of the disclosure.

FIG. 6B is a diagram illustrating a method of establishing a second connection based on a distance to an external electronic device by the electronic device 101 according to an embodiment of the disclosure.

Referring to FIG. 6B, a user 601b is shown as moving toward the external electronic device 201 (e.g., a vehicle) while holding the electronic device 101.

According to various embodiments of the disclosure, in operation 602b, the electronic device 101 may identify a distance between the electronic device 101 and the external electronic device 201 based on a first communication scheme. For example, the first communication scheme may be the UWB communication scheme or the Bluetooth communication scheme.

According to various embodiments of the disclosure, when the distance between the electronic device 101 and the external electronic device 201 becomes equal to or less than a threshold distance (e.g., about 3 m or 10 m) according to the movement of the user 601b, the electronic device 101 may establish a first connection (e.g., the first connection 203a of FIG. 2) based on the first communication scheme. According to various embodiments of the disclosure, the first connection (e.g., the first connection 203a in FIG. 2) may be established based on at least one of device-related information, communication connection information, or previous connection information about the external electronic device 201. For example, at least one of the communication connection information or the previous connection information may include a carkit profile.

According to various embodiments of the disclosure, the electronic device 101 may establish the first connection (e.g., the first connection 203a of FIG. 2) based on a communication scheme different from the communication scheme based on which the distance between the electronic device 101 and the external electronic device 201 is identified. For example, the electronic device 101 may identify the distance between the electronic device 101 and the external electronic device 201 based on the UWB communication scheme, and establish the first connection (e.g., the first connection 203a of FIG. 2) based on the Bluetooth communication scheme. In another example, the electronic device 101 may identify the distance between the electronic device 101 and the external electronic device 201 based on the Bluetooth communication scheme, and establish the first connection (e.g., the first connection 203a of FIG. 2) based on the UWB communication scheme. According to various embodiments of the disclosure, the distance between the electronic device 101 and the external electronic device 201 may be identified using at least one of the mobile communication module 305, the WLAN module 307, the UWB module 315, or the Bluetooth module 317. According to various embodiments of the disclosure, the electronic device 101 may accurately identify the distance between the electronic device 101 and the external electronic device 201 based on the UWB communication scheme, and perform various functions based on the Bluetooth communication scheme.

According to various embodiments of the disclosure, in operation 603b, the electronic device 101 may transmit data (e.g., a smart key) to the external electronic device 201 via the established first connection (e.g., the first connection 203a of FIG. 2). According to various embodiments of the disclosure, the data (e.g., the smart key) may include control information for unlocking a vehicle (e.g., the external electronic device 201). For example, the data (e.g., smart key) may be a carkit profile. According to various embodiments of the disclosure, the data (e.g., smart key) transmission may be performed based on reception of an input from the user 601b. For example, when the distance between the electronic device 101 and the external electronic device 201 is equal to or less than the threshold distance (e.g., about 3 m or 10 m), or the first connection (e.g., the first connection 203a of FIG. 2) is established, the electronic device 101 may output a visual notification (e.g., a notification message through the display) or an audible notification (e.g., a notification sound through the speaker) to the user 601b to identify whether to transmit the data (e.g., the smart key) to the user 601b, and accordingly, when the user 601b requests (approves) the data (e.g., smart key) transmission, may transmit the data (e.g., the smart key). In another example, when the distance between the electronic device 101 and the external electronic device 201 is equal to or less than the threshold distance (e.g., about 3 m or 10 m), or the first connection (e.g., the first connection 203a of FIG. 2) is established, the electronic device 101 may identify the detected type of the external electronic device 201, execute an application (e.g., a vehicle unlocking application) corresponding to the identified type of the external electronic device 201, and output a visual notification or an audible notification for identifying whether to transmit the data (e.g., the smart key) to the user 601b through the application.

According to various embodiments of the disclosure, when the data (e.g., the smart key) is transmitted or an application for transmitting the data (e.g., the smart key) is executed, the electronic device 101 may identify a first function is executed. For example, upon receipt of information indicating that the first function has been executed from the processor (e.g., processor 120 of FIG. 1), the first communication circuit (e.g., UWB module 315 or the Bluetooth module 317 of FIG. 3A), or the external electronic device 201, the second communication circuit (e.g., the WLAN module 307 of FIG. 3A) may identify that the first function has been executed. For example, the information indicating that the first function has been executed, received from the external electronic device 201 may be information about the state (e.g., unlocked or locked) of a car door, which may include information in the form of a flag having two or more values (e.g., 0 or 1).

According to various embodiments of the disclosure, when identifying that the first function has been executed, the electronic device 101 may activate the second communication circuit (e.g., the WLAN module 307 of FIG. 3A). According to various embodiments of the disclosure, the second communication circuit (e.g., the WLAN module 307 of FIG. 3A) may scan the external electronic device 201, using a signal having a strength equal to or less than a first threshold.

According to various embodiments of the disclosure, in operation 605b, when identifying the external electronic device 201 as a result of the scanning, the electronic device 101 may establish a Wi-Fi VLP connection (e.g., the second connection of FIG. 2) 203b) with the external electronic device 201.

According to various embodiments of the disclosure, the electronic device 101 may transmit data to and/or receive data from the external electronic device 201 via the established Wi-Fi VLP connection (e.g., the second connection 203b of FIG. 2). According to various embodiments of the disclosure, the second communication circuit (e.g., the WLAN module 307 of FIG. 3A) may transmit data to and/or receive data from the external electronic device 201 via the established Wi-Fi VLP connection (e.g., the second connection 203b of FIG. 2), using a signal having a strength equal to or less than the first threshold.

According to various embodiments of the disclosure, the electronic device 101 may detect the external electronic device 201 without identifying the distance between the electronic device 101 and the external electronic device 201, and establish the first connection (e.g., the first connection 203a of FIG. 2). For example, the electronic device 101 may detect the external electronic device 201 by receiving a first response signal (e.g., the first response signal of FIG. 4) or a second signal (e.g., the second signal of FIG. 4) based on the Bluetooth communication scheme, using the Bluetooth module (e.g., the Bluetooth module 317 of FIG. 3A). Since signal transmission and/or reception based on the Bluetooth communication scheme is possible in a short range (e.g., within about 10 m), the electronic device 101 may detect the external electronic device 201 located in a short range from the electronic device 101 without directly identifying (calculating) the distance between the electronic device 101 and establish the first connection (e.g., the first connection 203a in FIG. 2) with the external electronic device 201. According to an embodiment of the disclosure, the electronic device 101 may establish the first connection (e.g., the first connection 203a in FIG. 2) with the external electronic device 201 based on the strength of a signal (e.g., the first response signal based on the Bluetooth communication scheme (e.g., the first response signal) or the second signal (e.g., the second signal of FIG. 4)) received from the external electronic device 201. For example, the electronic device 101 may determine a signal strength based on which the first connection (e.g., the first connection 203a of FIG. 2) is to be established, based on a communication scheme (e.g., Bluetooth or UWB) and/or information about the external electronic device 201.

Figure 7:
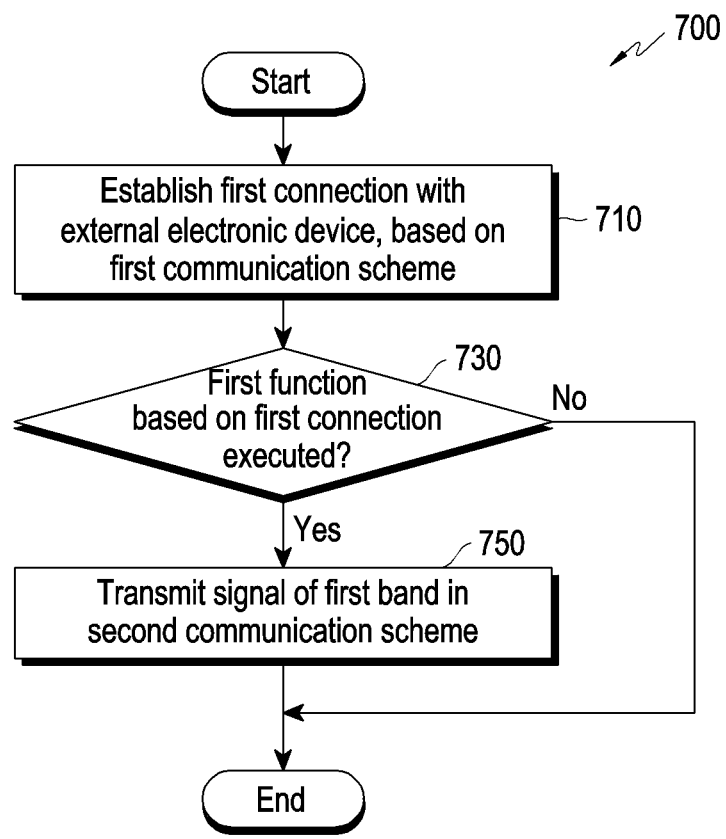
FIG. 7 is a flowchart illustrating a method of transmitting a signal in a first band by an electronic device according to an embodiment of the disclosure.

FIG. 7 is a flowchart 700 illustrating a method of transmitting a signal in a first band by an electronic device (e.g., the electronic device 101 of FIG. 1) according to an embodiment of the disclosure.

Referring to FIG. 7, in operation 710, the electronic device 101 may establish a first connection (e.g., the first connection 203a of FIG. 2) with an external electronic device (e.g., the external electronic device 201 of FIG. 2) based on a first communication scheme (e.g., Bluetooth or UWB).

According to various embodiments of the disclosure, in operation 730, the electronic device 101 may determine whether a first function based on the first connection (e.g., the first connection 203a of FIG. 2) has been executed.

According to various embodiments of the disclosure, when it is identified that the first function based on the first connection (e.g., the first connection 203a of FIG. 2) has been executed, the electronic device 101 may transmit a signal in a first band of a second communication scheme (e.g., Wi-Fi communication) in operation 750. According to various embodiments of the disclosure, when it is identified that the first function based on the first connection (e.g., the first connection 203a of FIG. 2) has been executed, the second communication circuit (e.g., the WLAN module 307 of FIG. 3A) may transmit the signal in the first band. According to various embodiments of the disclosure, when it is identified that the first function based on the first connection (e.g., the first connection 203a of FIG. 2) has been executed, the electronic device 101 may identify that an environment in which a Wi-Fi communication service is to be used is outdoors (or inside a transportation means). According to various embodiments of the disclosure, when identifying that the environment in which the Wi-Fi communication service is to be used is outdoors (or inside the transportation means), the electronic device 101 may transmit the signal in the first band among all frequency bands (e.g., the first band and a second band) supported by the second communication circuit (e.g., the WLAN module 307 of FIG. 3A). According to various embodiments of the disclosure, the first band may be a frequency band which is scanned to establish a second connection (e.g., the second connection 203b of FIG. 2) using a signal having a strength equal to or less than a first threshold (e.g., the first threshold in FIG. 4) (in other words, based on VLP Wi-Fi communication), or in which data is transmitted and/or received via the second connection (e.g., the second connection 203b of FIG. 2) after establishment of the second connection (e.g., the second connection 203b of FIG. 2). For example, the first band may include the 6 GHz band (in other words, a VLP service band). According to various embodiments of the disclosure, the first band may be different from a band (e.g., the second band) of a general Wi-Fi service. According to various embodiments of the disclosure, the second band may be a frequency band which is scanned to establish the second connection (e.g., the second connection 203b of FIG. 2) using a signal having a strength equal to or less than a second threshold (e.g., the second threshold in FIG. 4) (in other words, based on general Wi-Fi communication), or in which data is transmitted and/or received via the established second connection (e.g., the second connection 203b of FIG. 2). For example, the second band may include at least one of the 2.4 GHz band or the 5 GHz band. According to various embodiments of the disclosure, the second communication circuit (e.g., the WLAN module 307 of FIG. 3A) may be configured to be activated in general Wi-Fi mode and transmit a signal in the second band, upon activation with the first connection (e.g. the first connection 203a of FIG. 2) not established or the first function not executed.

According to various embodiments of the disclosure, the processor (e.g., the processor 120 of FIG. 1) or the second communication circuit (e.g., the WLAN module 307 of FIG. 3A) may identify that at least part of the 6 GHz band is the first band, based on at least one of the type of the electronic device 101, previous connection information about the external electronic device (e.g., the external electronic device 201 of FIG. 2), or frequency band information received from the external electronic device.

For example, the processor (e.g., the processor 120 of FIG. 1) or the second communication circuit (e.g., the WLAN module 307 of FIG. 3A) may identify different frequency bands in the 6 GHz band as the first band for the electronic device 101 as a mobile phone, and for the electronic device 101) as an AR/VR device (e.g., AR/VR glasses.

For example, the processor (e.g., the processor 120 of FIG. 1) or the second communication circuit (e.g., the WLAN module 307 of FIG. 3A) may identify previous connection information (e.g., frequency band information) about establishment of the second connection (e.g., the second connection 203b of FIG. 2) in response to the first connection (e.g., the first connection 203a of FIG. 2), and identify the first band to establish the second connection (e.g., the second connection 203b of FIG. 2) with the same external electronic device based on the identified previous connection information. According to various embodiments of the disclosure, the previous connection information may be stored in the memory (e.g., the memory 130 of FIG. 1) of the electronic device 101. According to various embodiments of the disclosure, the previous connection information may be identified based on device-related information about the external electronic device (e.g., the external electronic device 201 of FIG. 2). For example, the device-related information may include at least one of a model name, a manufacturer, or a MAC address. In an embodiment of the disclosure, when the electronic device 101 establishes a Bluetooth communication connection (e.g., the first connection 203a of FIG. 2) with a vehicle (e.g., the external electronic device 201 of FIG. 2) and executes a vehicle unlocking function (e.g., a carkit function), the electronic device 101 may attempt to establish a Wi-Fi communication connection (e.g., the second connection 203b of FIG. 2). In this case, the electronic device 101 may identify previous connection information (e.g., frequency band information) about establishment of the Wi-Fi communication connection (e.g., the second connection 203b of FIG. 2) in response to the Bluetooth communication connection (e.g., the first connection 203a of FIG. 2) to the vehicle (e.g., the external electronic device 201 of FIG. 2) matching at least one piece of information in the device-related information, and identify the first band for establishing the second connection with the vehicle (e.g., the external electronic device 201 of FIG. 2) through the second communication circuit (e.g., the WLAN module 307 of FIG. 3A) based on the identified previous connection information.

In an embodiment of the disclosure, the electronic device 101 may receive frequency band information indicating the first band from the external electronic device (e.g., the external electronic device 201 of FIG. 2). For example, the processor (e.g., the processor 120 of FIG. 1) or the first communication circuit (e.g., the UWB module 315 or the Bluetooth module 317 of FIG. 3A) may receive the frequency band information indicating the first band from the external electronic device (e.g., the external electronic device 201 of FIG. 2) via the first connection (e.g., the first connection 203a of FIG. 2). The processor (e.g., the processor 120 of FIG. 1) or the first communication circuit (e.g., the UWB module 315 or the Bluetooth module 317 of FIG. 3A) may transmit the received frequency band information indicating the first band to the second communication circuits (e.g., the WLAN module 307 of FIG. 3A), and the second communication circuit (e.g., the WLAN module 307 of FIG. 3A) may identify the first band based on the frequency band information.

According to various embodiments of the disclosure, when the electronic device 101 is located inside the external electronic device (e.g., the external electronic device 201 of FIG. 2) or in a short range (e.g., within about 3 m or 10 m) from the external electronic device (e.g., the external electronic device 201 of FIG. 2), and the user intends to establish the second connection (e.g., the second connection 203b of FIG. 2) based on the VLP Wi-Fi communication scheme and transmit and/or receive data, the electronic device 101 may identify that the first connection (e.g., the first connection 203a of FIG. 1) of the first communication scheme (e.g., the Bluetooth communication scheme or the UWB communication scheme), which is a short-range communication scheme relative to the second communication scheme (e.g., Wi-Fi communication), and/or execution of the function based on the first connection (e.g., the first connection 203a of FIG. 1) has been performed. For example, as the electronic device 101 identifies that the execution of the first function has been identified, the electronic device 101 may perform scanning in the first band (e.g., the 6 GHz band) used in the VLP Wi-Fi communication scheme, instead of the second band (e.g., the 2.4 GHz band or the 5 GHz band) used in the general Wi-Fi communication scheme, and thus meet the user's intention to use the VLP Wi-Fi communication scheme. According to an embodiment of the disclosure, the electronic device 101 may reduce a scan time required to establish the second connection (e.g., the second connection 203b of FIG. 2) by identifying, as the first band, at least part of the 6 GHz band used in the VLP Wi-Fi communication scheme, identified based on the type of the electronic device 101, previous connection information about the external electronic device (e.g., the external electronic device 201), or frequency band information received from the external electronic device.

Figure 8A:
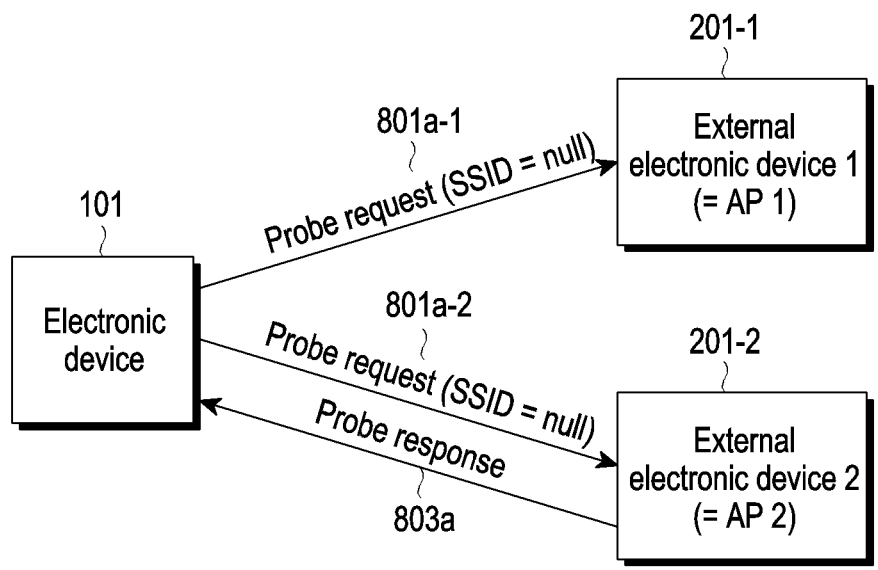
FIG. 8A is a diagram illustrating an active scanning operation of an electronic device according to an embodiment of the disclosure.

FIG. 8A is a diagram illustrating an active scanning operation of the electronic device 101 according to an embodiment of the disclosure.

Figure 8B:
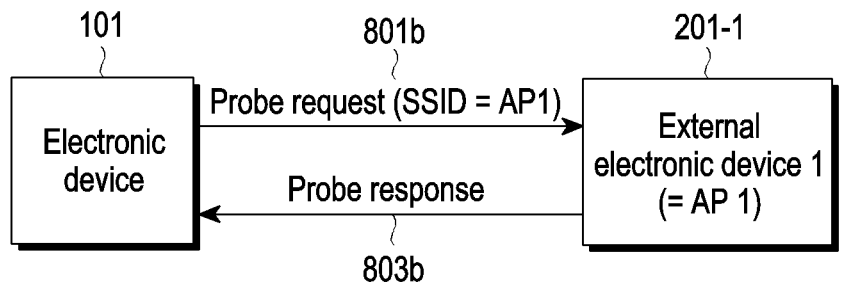
FIG. 8B is a diagram illustrating an active scanning operation of an electronic device 101 according to an embodiment of the disclosure.

FIG. 8B is a diagram illustrating an active scanning operation of the electronic device 101 according to an embodiment of the disclosure.

Figure 8C:
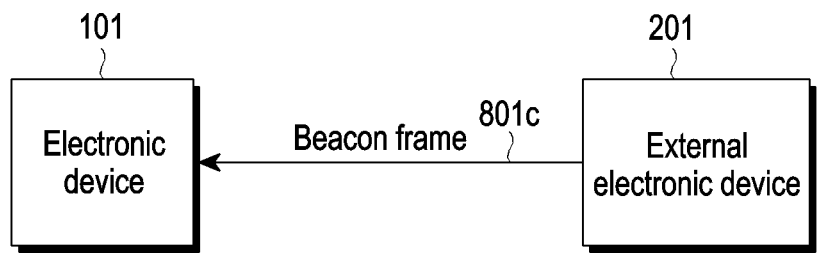
FIG. 8C is a diagram illustrating a passive scanning operation of the electronic device 101 according to an embodiment of the disclosure.

FIG. 8C is a diagram illustrating a passive scanning operation of the electronic device 101 according to an embodiment of the disclosure.

According to various embodiments of the disclosure, the electronic device 101 may perform a scanning operation for obtaining at least one of device-related information or communication connection information about the external electronic device 201 located around the electronic device 101, while switching channels within a frequency band range by using the second communication circuit (e.g., the WLAN module 307 of FIG. 3A). For example, the device-related information may include at least one of a model name, a manufacturer, or a MAC address. According to various embodiments of the disclosure, the communication connection information is information required to establish a second connection (e.g., the second connection 203b of FIG. 2) with the external electronic device (e.g., the external electronic device 201 of FIG. 2), and may include frequency band information (in other words, channel information) for establishing the second connection (e.g., the second connection 203b of FIG. 2).

According to various embodiments of the disclosure, the active/passive scanning operation of the electronic device 101 to be described later may be performed on the first band or the second band of FIG. 7, and may be performed sequentially on all frequency bands supported by the second communication circuit (e.g., the WLAN module 307 of FIG. 3A).

Referring to FIG. 8A, an active scanning operation of the electronic device 101 without searching for a specific service set identifier (SSID) is illustrated.

According to various embodiments of the disclosure, the electronic device 101 may periodically broadcast probe requests 801a-1 and 801a-2 that do not search for a specific SSID by using the second communication circuit (e.g., the WLAN module 307 of FIG. 3A), while switching channels within a frequency band range. According to various embodiments of the disclosure, the length of an SSID field may be set to 0 (e.g., SSID=null) in the probe requests 801a-1 and 801a-2.

According to various embodiments of the disclosure, the broadcast probe requests 801a-1 and 801a-2 may be received by one or more external electronic devices 201-1 and 201-2 located around the electronic device 101.

According to various embodiments of the disclosure, at least one (e.g., a second external electronic device 201-2) of the one or more external electronic devices 201-1 and 201-2 that have received the probe requests 801a-1 and 801a-2 may transmit a probe response 803a corresponding to the probe request 801a-2 to the electronic device 101.

According to various embodiments of the disclosure, the electronic device 101 may receive the probe response 803a by using the second communication circuit (e.g., the WLAN module 307 of FIG. 3A). Accordingly, the electronic device 101 may identify device-related information or communication connection information about the second external electronic device 201-2 included in the received probe response 803a, and establish a second connection (e.g., the second connection 203b of FIG. 2) with the second external electronic device 201-2 based on the identified information.

Referring to FIG. 8B, an active scanning operation of the electronic device 101 to search for a specific SSID is illustrated.

According to various embodiments of the disclosure, the electronic device 101 may unicast a probe request 801b that searches for a specific SSID (e.g., SSID=AP1) to a first external electronic device 201-1 corresponding to the specific SSID by using the second communication circuit (e.g., the WLAN module 307 of FIG. 3A), while switching channels within the frequency band range. According to various embodiments of the disclosure, when configured to access a specified wireless network, the electronic device 101 may unicast an SSID corresponding to the specified wireless network in a probe request 801b (e.g., SSID=AP1) to the first electronic device 201-1. According to various embodiments of the disclosure, when the electronic device 101 is already connected to the wireless network (e.g., a first connection (e.g., the first connection 203a of FIG. 2) has been established with the first external electronic device 201-1), the electronic device 101 may unicast the SSID corresponding to the connected wireless network in the probe request 801b (e.g., SSID=AP1) to the first external electronic device 201-1. According to various embodiments of the disclosure, the SSID corresponding to the connected wireless network may be obtained from the first external electronic device 201-1 via the established first connection (e.g., the first connection 203a of FIG. 2).

According to various embodiments of the disclosure, upon receipt of the probe request 801b, the first external electronic device 201-1 may transmit a probe response 803b corresponding to the probe request 801b to the electronic device 101.

According to various embodiments of the disclosure, the electronic device 101 may receive the probe response 803b by using the second communication circuit (e.g., the WLAN module 307 of FIG. 3A). Accordingly, the electronic device 101 may identify device-related information or communication connection information about the external electronic device 201-1 included in the received probe response 803b, and establish a second connection (e.g., the second connection 203b of FIG. 2) with the external electronic device 1 201-1) based on the identified information.

Referring to FIG. 8C, a passive scanning operation of the electronic device 101 is illustrated.

According to various embodiments of the disclosure, the electronic device 101 may listen to a beacon frame 801c periodically transmitted by the external electronic device 201 by using the second communication circuit (e.g., the WLAN module 307 of FIG. 3A), while switching channels within the frequency band range.

According to various embodiments of the disclosure, the electronic device 101 may identify information about a channel in which the beacon frame 801c has been received or device-related information or communication connection information about the external electronic device 201 included in the received beacon frame 801c, and establish a second connection (e.g., the second connection 203b of FIG. 2) with the external electronic device 201 based on the information.

According to various embodiments of the disclosure, the electronic device 101 may transmit data to and/or receive data from the external electronic device 201 through the scanning operations described with reference to FIGS. 8B to 8C and/or the second connection (e.g., the second connection 203b of FIG. 2), based on a signal having a strength equal to or less than a first threshold (e.g., the first threshold of FIG. 4) or a second threshold (e.g., the second threshold of FIG. 4) depending on whether a first function based on a first connection (e.g., the first connection 203a in FIG. 2) has been executed.

Figure 9A:
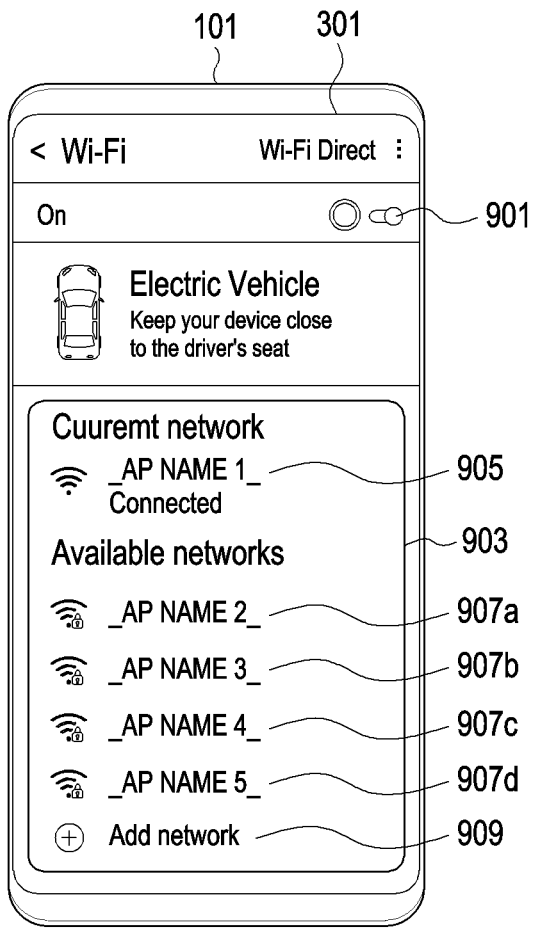
FIG. 9A is a diagram illustrating a scanning result displayed on an electronic device according to an embodiment of the disclosure.

FIG. 9A is a diagram illustrating scanning results 903 displayed on the electronic device 101 according to an embodiment of the disclosure.

Referring to 9A, the electronic device 101 may display the scanning results 903 of a scanning operation of the second communication circuit (e.g., the WLAN module 307 of FIG. 3A) for establishing a second connection (e.g., the second connection 203b of FIG. 2) on the display 301.

According to various embodiments of the disclosure, the scanning results 903 may display at least one of information 905 (e.g., SSID) about at least one external electronic device connected via the second connection (e.g., the second connection 203b of FIG. 2) of the second communication circuit (e.g., the WLAN module 307 of FIG. 3A) or information 907a to 907d (e.g., SSIDs) about one or more detected external electronic devices.

According to various embodiments of the disclosure, upon receipt of an input that selects any one of the information 907a to the information 907d (e.g., SSIDs) about the one or more detected external electronic devices from the user, the electronic device 101 may establish a second connection (e.g., the second connection 203b of FIG. 2) with an external electronic device corresponding to the selected information and be connected to the external electronic device.

According to various embodiments of the disclosure, when a first connection (e.g., the first connection 203a of FIG. 2) has been established with a specific external electronic device, the electronic device 101 may display an indicator by including the indicator in the information 905, 907a, 907b, 907c, or 907d about an external electronic device corresponding to the specific external electronic device may include an indicator. According to various embodiments of the disclosure, the external electronic device corresponding to the specific external electronic device may be identified based on whether at least one piece of information (e.g., a model name, a manufacturer, or a MAC address) in device-related information matches the external electronic device.

According to various embodiments of the disclosure, the electronic device 101 may display a toggle 901 to turn on or off activation of the second communication circuit (e.g., the WLAN module 307 of FIG. 3A) on the display 301.

According to various embodiments of the disclosure, the electronic device 101 may display a new network addition item 909 to receive an input for a new network from the user on the display.

Figure 9B:
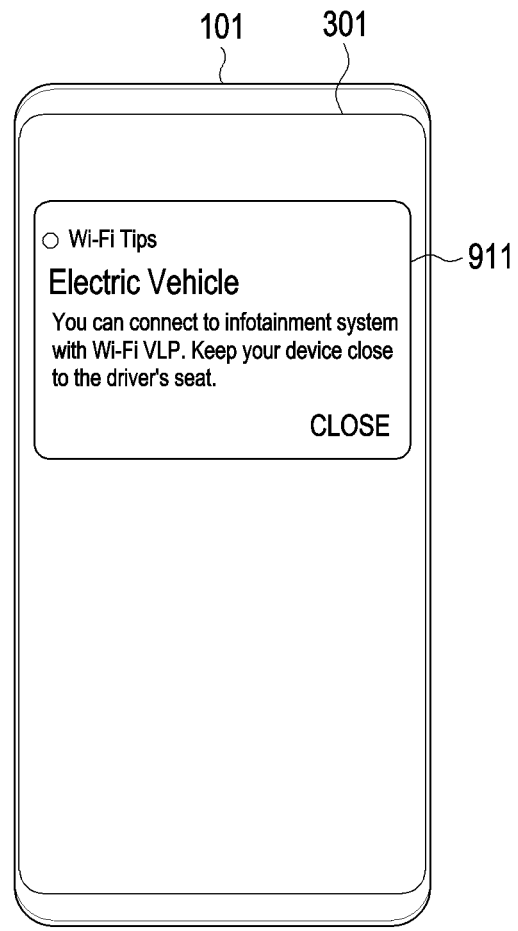
FIG. 9B is a diagram illustrating a notification message displayed on an electronic device according to an embodiment of the disclosure.

FIG. 9B is a diagram illustrating a notification message 911 displayed on the electronic device 101 according to an embodiment of the disclosure.

According to various embodiments of the disclosure, the electronic device 101 may display the notification message 911 indicating that a second connection (e.g., the second connection 203b of FIG. 2) is possible with an external electronic device (e.g., the external electronic device 201 of FIG. 2) on the display 301.

According to various embodiments of the disclosure, the electronic device 101 may display the notification message in response to at least one of establishment of a first connection (e.g., the first connection 203a of FIG. 2) based on the first communication scheme, execution of a first function based on the established first connection (e.g., the first connection of FIG. 2), or identification of an external electronic device (e.g., the external electronic device 201 of FIG. 2) according to scanning for establishing a second connection in response to the execution of the first function. According to various embodiments of the disclosure, the identified external electronic device (e.g., the external electronic device 201 of FIG. 2) may be an external electronic device matching the external electronic device with which the first connection (e.g., the first connection 203a of FIG. 2) has been established, in terms of at least one piece of information (e.g., a model name, a manufacturer, or a MAC address) in device-related information.

Figure 10:
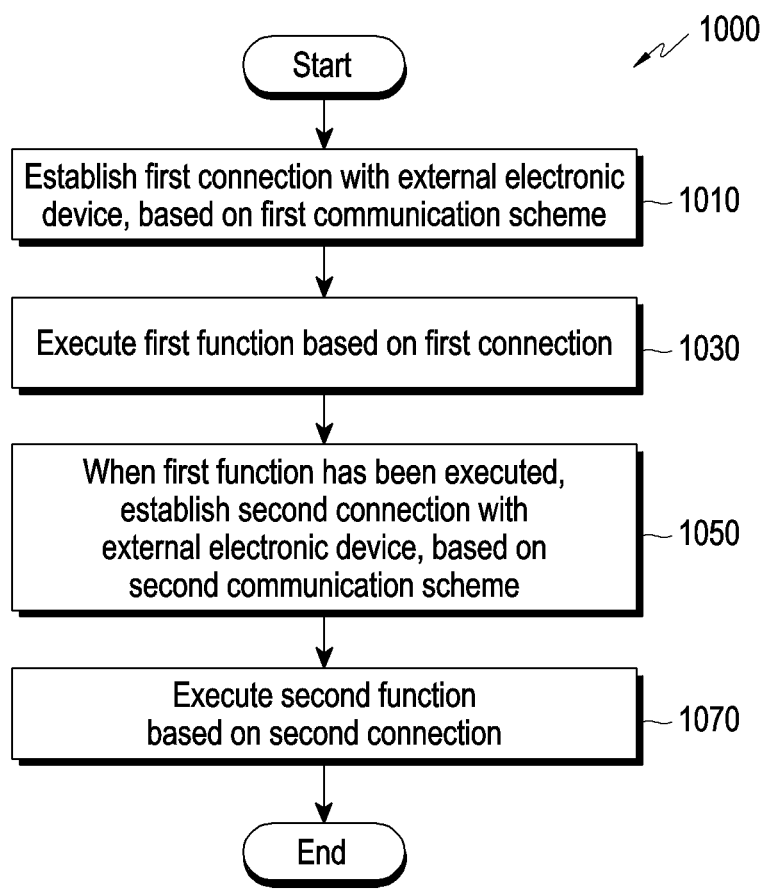
FIG. 10 is a flowchart illustrating a method of executing two functions by an electronic device according to an embodiment of the disclosure.

FIG. 10 is a flowchart 1000 illustrating a method of executing a second function by an electronic device (e.g., the electronic device 101 of FIG. 1) according to an embodiment of the disclosure.

Referring to FIG. 10, in operation 1010, the electronic device 101 may establish a first connection (e.g., the first connection 203a of FIG. 2) with an external electronic device (e.g., the external electronic device 201 of FIG. 2) based on a first communication scheme. For example, the first communication circuit (e.g., the UWB module 315 or the Bluetooth module 317 of FIG. 3A) may establish the first connection (e.g., the first connection 203a of FIG. 2) with the external electronic device (e.g., the external electronic device 201 of FIG. 2) through the first communication scheme (e.g., UWB communication or Bluetooth communication).

According to various embodiments of the disclosure, in operation 1030, the electronic device 101 may execute a first function based on the first connection (e.g., the first connection 203a of FIG. 2). According to various embodiments of the disclosure, the first function may include at least one of data transmission and/or reception via the established first connection (e.g., the first connection 203a of FIG. 2) or execution of an application used for the data transmission and/or reception via the established first connection (e.g., the first connection 203a of FIG. 2).

According to various embodiments of the disclosure, in operation 1050, when the first function has been executed, the electronic device 101 may establish a second connection (e.g., the second connection 203b of FIG. 2) with the external electronic device (e.g., the external electronic device 201 of FIG. 2) based on a second communication scheme. For example, the second communication circuit (e.g., the WLAN module 307 of FIG. 3A) may establish the second connection (e.g., the second connection 203b of FIG. 2) with the external electronic device (e.g., the external electronic device 201 of FIG. 2) based on the second communication scheme (e.g., the Wi-Fi communication scheme). The establishment of the second connection (e.g., the second connection 203b of FIG. 2) based on the execution of the first function may be performed according to a signal based on at least one of a first threshold (e.g., the first threshold of FIG. 4) or a first band (e.g., the first band of FIG. 7). According to various embodiments of the disclosure, the electronic device 101 may compare device-related information or communication connection information about an external electronic device (e.g., the external electronic device 201 of FIG. 2) obtained during scanning for establishing the first connection (e.g., the first connection 203a of FIG. 2) with device-related information or communication connection information about an external electronic device (e.g., the external electronic device 201 of FIG. 2) obtained during scanning for establishing the second connection (e.g., the second connection 203b of FIG. 2). According to various embodiments of the disclosure, when identifying an external electronic device 201 matching in at least one of device-related information or communication connection information as a result of the comparison, the electronic device 101 may establish the second connection (e.g., the second connection 203b of FIG. 2) with the identified external electronic device 201. According to an embodiment of the disclosure, the electronic device 101 may execute the first function based on the first connection (e.g., the first connection 203a of FIG. 2). When a signal strength in the first communication scheme is equal to or greater than a predetermined value, the electronic device 101 may establish the second connection (e.g., the second connection 203b of FIG. 2) with the external electronic device based on the second communication scheme. For example, when the signal strength in the first communication scheme is equal to or greater than the predetermined value, the electronic device 101 may establish the second connection (e.g., the second connection 203b of FIG. 2) by activating the second communication circuit (e.g., the WLAN module 307 of FIG. 3A).

According to various embodiments of the disclosure, in operation 1070, the electronic device 101 may execute a second function based on the second connection (e.g., the second connection 203b of FIG. 2). According to various embodiments of the disclosure, the second function may include at least one of data transmission and/or reception via the established second connection (e.g., the second connection 203b of FIG. 2) or execution of an application used for the data transmission and/or reception via the established second connection (e.g., the second connection 203b of FIG. 2). For example, data transmitted and/or received via the established second connection (e.g., the second connection 203b in FIG. 2) may include at least one of call-related video data, music data, video data, data for controlling a function in a vehicle (e.g., in-vehicle entertainment system control data), or data for controlling a function in the electronic device. For example, the executed application may include at least one of a call application, a playback application, a vehicle control application (e.g., Android Auto application), or an electronic device control application. According to various embodiments of the disclosure, the application of the second function may correspond to or different from the application of the first function. According to various embodiments of the disclosure, at least one of data or an executed application via the established second connection (e.g., the second connection 203b of FIG. 2) may be determined based on at least one of the type of the electronic device 101, the type of the external electronic device (e.g., the external electronic device 201 of FIG. 2), a transmission power magnitude set (e.g., the first threshold or the second threshold of FIG. 4) for the second connection (e.g., the second connection 203b of FIG. 2), a frequency band (e.g., the first band or the second band of FIG. 7) configured for the second connection (e.g., the second connection 203b in FIG. 2), or characteristics of the established first connection (e.g., the first connection 203a of FIG. 2). For example, when a portable phone (e.g., the electronic device 101 of FIG. 1) is connected to a vehicle (e.g., the external electronic device 201 of FIG. 2) based on a signal having a strength equal to or less than about 25 mW in a specific frequency band of the Wi-Fi 6 GHz band, the portable phone (e.g., the electronic device 101 of FIG. 1) may activate an in-vehicle entertainment system (e.g., Android Auto) of the portable phone (e.g., the electronic device 101 of FIG. 1) to use entertainment through an electronic control system of the vehicle. For example, the characteristics of the established first connection (e.g., the first connection 203a of FIG. 2) may include at least one of the type (in other words, communication scheme) of the first connection (e.g., the first connection 203a of FIG. 2) or the presence or absence of a security configuration. For example, when the type of the first connection (e.g., the first connection 203a of FIG. 2) is Bluetooth communication, data or an executed application via the established second connection (e.g., the second connection 203b of FIG. 2) may be determined based on a Bluetooth profile. In another example, when the electronic device 101 is an AR/VR glasses device, the strength of a signal may be set to be small (e.g., about 13 mW or less) or a designated frequency of the Wi-Fi 6 GHz band may be used.

According to various embodiments of the disclosure, the electronic device 101 may provide various conveniences to the user by providing the second connection via the second connection (e.g., the second connection 203b of FIG. 2) as well as the first function through the first connection (e.g., the first connection 203a of FIG. 2).

Figure 11A:
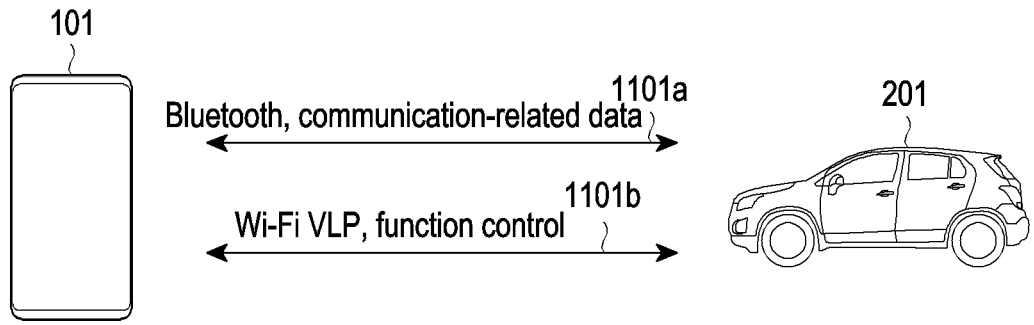
FIG. 11A is a diagram illustrating a method of providing independent functions via a plurality of connections by an electronic device according to an embodiment of the disclosure.

FIG. 11A is a diagram illustrating a method of providing independent functions via a plurality of connections by the electronic device 101 according to an embodiment of the disclosure.

Figure 11B:
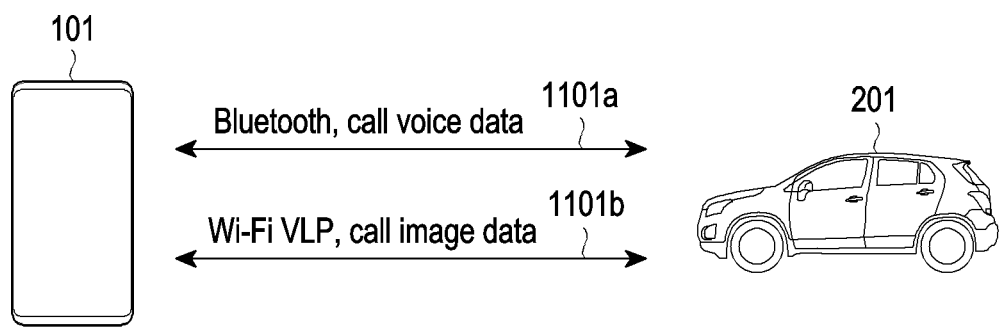
FIG. 11B is a diagram illustrating a method of providing correlated functions via a plurality of connections by an electronic device according to an embodiment of the disclosure.

FIG. 11B is a diagram illustrating a method of providing correlated functions via a plurality of connections by the electronic device 101 according to an embodiment of the disclosure.

Figure 11C:
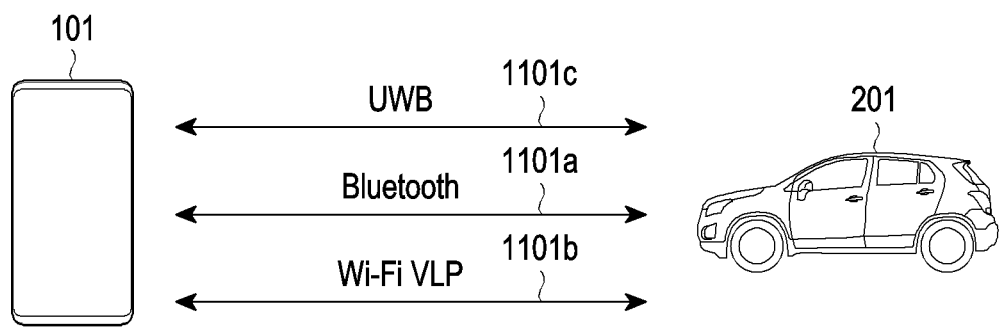
FIG. 11C is a diagram illustrating a method of providing functions via a plurality of connections by an electronic device according to an embodiment of the disclosure.

FIG. 11C is a diagram illustrating a method of providing functions via a plurality of connections by the electronic device 101 according to an embodiment of the disclosure.

According to various embodiments of the disclosure, the electronic device 101 may establish a Bluetooth connection 1101a (e.g., the first connection 203a of FIG. 2) based on the Bluetooth communication scheme and a Wi-Fi connection 1101b (e.g., the second connection 203b of FIG. 2) based on the Wi-Fi communication scheme with the external electronic device 201. According to various embodiments of the disclosure, when the electronic device 101 establishes the Wi-Fi connection 1101b based on execution of a first function based on the Bluetooth connection 1101a, the electronic device 101 may perform data transmission and/or reception via the Wi-Fi connection 1101b (e.g., the second connection 203b of FIG. 2) based on at least one of a first threshold (e.g., the first threshold of FIG. 4) and/or a first band (e.g., the first band of FIG. 7).

Referring to FIG. 11A, the electronic device 101 and the external electronic device 201 may provide independent functions via the Bluetooth connection 1101a and the Wi-Fi connection 1101b.

According to various embodiments of the disclosure, the electronic device 101 may execute a call application. According to various embodiments of the disclosure, the electronic device 101 may obtain voice data of the user by using a microphone (e.g., the input device 150 of FIG. 1). According to various embodiments of the disclosure, the electronic device 101 may obtain image data of the user by using a camera (e.g., the camera module 180 of FIG. 1). According to various embodiments of the disclosure, the electronic device 101 may transmit at least one of the voice data or the image data to the external electronic device 201 via the Bluetooth connection 1101a. According to various embodiments of the disclosure, the external electronic device 201 may execute a call application corresponding to the call application in the electronic device 101. According to various embodiments of the disclosure, the external electronic device 201 may receive at least one of the voice data or the image data from the electronic device 101 and output the received data through an output device (e.g., a speaker or a display) of the external electronic device 201. According to various embodiments of the disclosure, the external electronic device 201 may obtain at least one of voice data or image data by using an input device (e.g., a microphone or a camera) of the external electronic device 201, and transmit the obtained data to the electronic device 101.

According to various embodiments of the disclosure, the electronic device 101 may control a function of the external electronic device 201 via the Wi-Fi connection 1101b. According to various embodiments of the disclosure, the electronic device 101 may receive an input for controlling the external electronic device from the user through the display (e.g., the display 301 of FIG. 3A) or the microphone (e.g., the input device 150 of FIG. 1). According to various embodiments of the disclosure, the electronic device 101 may control music or video playback in the external electronic device 201 based on a user input received by the electronic device 101. According to various embodiments of the disclosure, the external electronic device 201 may control a function of the electronic device 101 through the Wi-Fi connection 1101b. For example, the external electronic device 201 may receive an input for controlling the electronic device 101 through the input device (e.g., the display or the microphone) of the external electronic device 201. For example, when a screen mirroring function is executed and thus an execution screen corresponding to a screen displayed on the electronic device 101 is being displayed on the display of the external electronic device 201, via the Wi-Fi connection 1101b, the external electronic device 201 may receive a user input for controlling the screen of the electronic device 101 through the display (e.g., a touch screen) of the external electronic device 201 and control the screen of the electronic device 101 via the Wi-Fi connection 1101b. When call-related data is transmitted to and/or received from the electronic device via the Bluetooth connection 1101a, the external electronic device 201 may receive a user input for terminating a call by using the display or the microphone of the external electronic device 201, and control the electronic device 101 to terminate the call application of the electronic device 101 via the Wi-Fi connection 1101b.

The electronic device 101 according to an embodiment of the disclosure may provide various conveniences to the user by independently providing the first function via the Bluetooth connection 1101a (e.g., the first connection 203a of FIG. 2) and the second function via the Wi-Fi connection 1101b (e.g., the second connection 203b).

Referring to FIG. 11B, the electronic device 101 and the external electronic device 201 may provide functions related to each other via the Bluetooth connection 1101a and the Wi-Fi connection 1101b.

According to various embodiments of the disclosure, the electronic device 101 may execute a call application. According to various embodiments of the disclosure, the electronic device 101 may transmit call-related data to the external electronic device 201 via the Bluetooth connection 1101a and the Wi-Fi connection 1101b. For example, according to various embodiments of the disclosure, in the case of a video call, the electronic device 101 may transmit voice data to the external electronic device 201 via the Bluetooth connection 1101a, and image data linked to the voice data to the external electronic device 201 via the Wi-Fi connection 1101b. According to various embodiments of the disclosure, the external electronic device 201 may receive the voice data and the image data from the electronic device 101, output the voice data through the speaker of the external electronic device 201, and display the image data on the display.

According to various embodiments of the disclosure, the external electronic device 201 may obtain voice data and image data by using the input device (e.g., the microphone or the camera) of the external electronic device 201, and transmit the obtained data to the electronic device 101 via the Bluetooth connection 1101a and the Wi-Fi connection 1101b.

According to various embodiments of the disclosure, the electronic device 101 may perform an authentication operation for controlling a specific function of the external electronic device 201 (e.g., a vehicle) via the Bluetooth connection 1101a, and execute the specific function via the Wi-Fi connection 1101b.

According to an embodiment of the disclosure, the electronic device 101 may provide various conveniences to the user by providing a first function via the Bluetooth connection 1101a (e.g., the first connection 203a of FIG. 2) and a second function related to the first function via the Wi-Fi connection 1101b (e.g., the second connection 203b of 2). Further, even if the second connection (e.g., the Wi-Fi connection 1101b) becomes unstable, voice quality may be secured via the first connection (e.g., the Bluetooth connection 1101a).

Referring to FIG. 11C, the electronic device 101 and the external electronic device 201 may establish a UWB connection 1101c in addition to the Bluetooth connection 1101a and the Wi-Fi connection 1101b. For example, the electronic device 101 may execute a vehicle unlocking function via the UWB connection 1101c and establish the Wi-Fi connection 1101b in response to the execution of the vehicle unlocking function. When the electronic device 101 executes a specific application (e.g., a call application) based on the Bluetooth connection 1101a and the Wi-Fi connection 1101b after the establishment of the UWB connection 1101c and the Wi-Fi connection 1101b, the electronic device 101 may further establish the Bluetooth connection 1101a and execute a specific function (e.g., a video call) via the Bluetooth connection 1101a and the Wi-Fi connection 1101b.

The functions executed based on the Bluetooth connection 1101a, the Wi-Fi connection 1101b, and the UWB connection 1101c, have been described with reference to FIGS. 11A to 11C according to an embodiment of the disclosure. The function executed based on the Bluetooth connection 1101a, the Wi-Fi connection 1101b, and the UWB connection 1101c may also be executed crosswise based on other connections. For example, the function of the external electronic device 201 may be controlled via the Bluetooth connection 1101a, and call-related data may be transmitted and/or received via the Wi-Fi connection 1101b.

Figure 12:
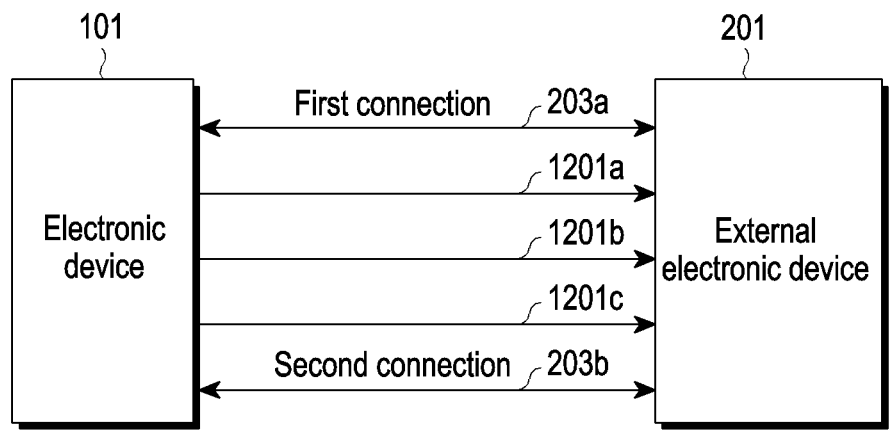
FIG. 12 is a diagram illustrating a method gradually increasing transmission power during scanning by an electronic device according to an embodiment of the disclosure.

FIG. 12 is a diagram illustrating a method of gradually increasing transmission power during scanning by the electronic device 101 according to an embodiment of the disclosure.

Referring to FIG. 12, the electronic device 101 may establish the first connection 203a with the external electronic device 201 and execute a first function based on the first connection 203a.

According to various embodiments of the disclosure, the electronic device 101 may perform a scanning operation to establish the second connection 203b with the external electronic device 201 based on the execution of the first function. According to various embodiments of the disclosure, the electronic device 101 may scan the external electronic device 201 (1201a, 1201b, and 1201c), while gradually increasing transmission power within a range equal to or less than a first threshold. For example, according to various embodiments of the disclosure, the electronic device 101 may transmit a signal equal to or less than the threshold while gradually increasing the transmission power to 10 mW, 15 mW, 20 mW, or 25 mW in the range equal to or less than the first threshold (e.g., about 25 mW). For example, according to various embodiments of the disclosure, the electronic device 101 may scan the external electronic device 201 by using a signal having transmission power of 10 mW. When failing to detect the external electronic device 201, the external electronic device 201 may scan the external electronic device 201 by using a signal having transmission power of 15 mW. In this manner, the electronic device 101 may scan the external electronic device 201, while gradually increasing the transmission power within the range equal to or less the first threshold (e.g., about 25 mW) until the external electronic device 201 is detected. This operation may reduce the impact on the existing environment using the 6 GHz band.

According to various embodiments of the disclosure, the first threshold may be determined based on an EIRP. For example, the transmission power of 25 mW may correspond to an EIRP of 14 dBm. According to various embodiments of the disclosure, the electronic device 101 may scan the external electronic device 201 by transmitting a signal while gradually increasing the transmission power within a range where the EIRP is 14 dBm. According to various embodiments of the disclosure, the electronic device 101 may scan the external electronic device 201 by transmitting a signal while gradually increasing the transmission power within a range equal to or less than about −5 dBM/MHz based on an EIRP spectral density limitation.

According to various embodiments of the disclosure, the scanning operation for establishing the second connection 203b with the external electronic device 201, performed based on the execution of the first function described above may be performed on a first band (e.g., the first band of FIG. 7) among all frequency bands (e.g., the first band and the second band of FIG. 7) supported by the second communication circuit (e.g., the WLAN module 307 of FIG. 3A) of the electronic device 101. According to various embodiments of the disclosure, when the electronic device 101 scans the first band (e.g., the first band of FIG. 7), the electronic device 101 may preferentially scan at least part of the first band (e.g., the first band of FIG. 7), which is identified based on the type of the electronic device 101, previous connection information about the external electronic device (e.g., the external electronic device 201 of FIG. 2), or frequency band information received from the external electronic device.

Figure 13:
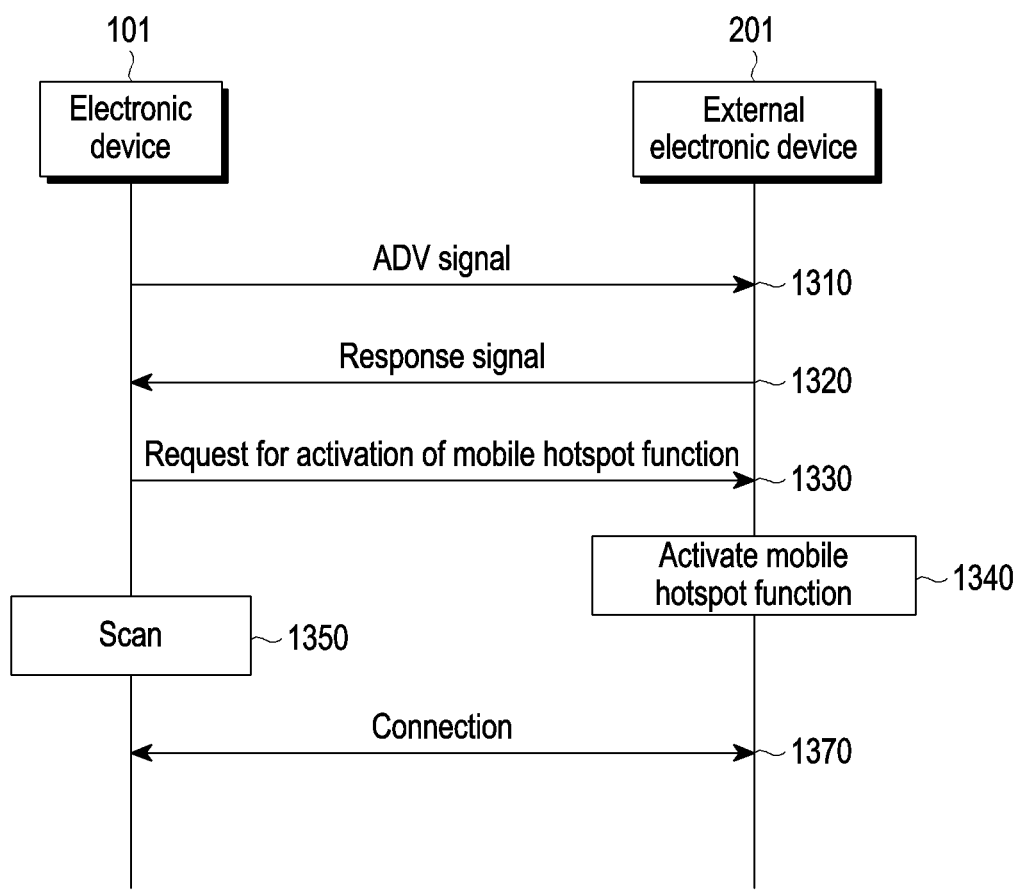
FIG. 13 is a flowchart illustrating a method of establishing a connection based on a mobile hotspot with an electronic device by an electronic device according to an embodiment of the disclosure.

FIG. 13 is a flowchart 1300 illustrating a method of establishing a connection based on a mobile hotspot with the external electronic device 201 by the electronic device 101 according to an embodiment of the disclosure.

Referring to FIG. 13, the electronic device 101 may transmit an advertisement (ADV) signal to the external electronic device 201 in operation 1310. For example, the ADV signal may be a signal based on the Bluetooth communication scheme. According to various embodiments of the disclosure, the ADV signal may be transmitted according to any one of broadcast, multicast, and unicast schemes. According to various embodiments of the disclosure, the ADV signal may include user identification information (e.g., an SSID). According to various embodiments of the disclosure, the user identification information (e.g., the SSID) may be identified based on previous connection information between the external electronic device 201 and the electronic device 101. According to various embodiments of the disclosure, the user identification information (e.g., the SSID) may be user-input information.

According to various embodiments of the disclosure, when the external electronic device 201 supporting a mobile hotspot function and matching the user identification information receives the ADV signal, the external electronic device 201 may transmit a response signal corresponding to the ADV signal to the electronic device 101 in operation 1320. According to various embodiments of the disclosure, the response signal may be, for example, at least one of permission information indicating whether the external electronic device 201 allows activation of the mobile hotspot function or information indicating whether the external electronic device 201 receiving the ADV signal is a device corresponding to the user identification information.

According to various embodiments of the disclosure, the electronic device 101 may receive the response signal, and when the permission information included in the response signal allows activation of the mobile hotspot function or indicates that the external electronic device 201 corresponds to the user identification information, the electronic device 101 may transmit a request for activation of the mobile hotspot function to the external electronic device 201 based on Bluetooth communication (e.g., BLE communication) in operation 1330. According to various embodiments of the disclosure, the electronic device 101 may activate the second communication circuit (e.g., the WLAN module 307 of FIG. 3A) to transmit a signal having a strength equal to or less than a first threshold.

According to various embodiments of the disclosure, the external electronic device 201 may receive the request for activation of the mobile hotspot function and activate the mobile hotspot function in operation 1340.

According to various embodiments of the disclosure, in operation 1350, the electronic device 101 may scan the external electronic device 201 in which the mobile hotspot function has been activated. According to various embodiments of the disclosure, the electronic device 101 may perform the scanning based on a signal in a range equal to or less than the first threshold. According to various embodiments of the disclosure, the electronic device 101 may scan the external electronic device 201, while gradually increasing the strength of transmission power within the range equal to or less than the first threshold.

According to various embodiments of the disclosure, in operation 1370, the electronic device 101 may establish a connection (e.g., the second connection 203b of FIG. 2) with the external electronic device 201 identified through the scanning through the second communication circuit (e.g., the WLAN module 307 of FIG. 3A).

Alternatively, according to various embodiments of the disclosure, the electronic device 101 may receive a signal including user identification information from the external electronic device 201 based on Bluetooth communication (e.g., BLE communication). According to various embodiments of the disclosure, in response to the reception of the user identification information from the external electronic device 201, the electronic device 101 may transmit a request for activation of the mobile hotspot function to the external electronic device 201, based on Bluetooth communication (e.g., BLE communication).

According to various embodiments of the disclosure, an electronic device (e.g., the electronic device 101 of FIG. 1) may include a first communication circuit (e.g., the UWB module 315 or the Bluetooth module 317 of FIG. 3A) supporting a first communication scheme, and a second communication circuit (e.g., the WLAN module 307 of FIG. 3A) supporting a second communication scheme, and configured to transmit a signal having a strength equal to or less than a first threshold (e.g., the first threshold of FIG. 4) in at least one first band (e.g., the first band of FIG. 7), and transmit a signal having a strength equal to or less than a second threshold (e.g., the second threshold of FIG. 4) in at least one second band (e.g., the second band of FIG. 7). The first communication circuit (e.g., the UWB module 315 or the Bluetooth module 317 of FIG. 3A) may be configured to establish a first connection (e.g., the first connection 203a of FIG. 2) with an external electronic device based on the first communication scheme, and the second communication circuit (e.g., the WLAN module 307 of FIG. 3A) may be configured to transmit the signal having the strength equal to or less than the first threshold (e.g., the first threshold of FIG. 4) based on execution of a first function based on the first connection (e.g., the first connection 203a of FIG. 2). The first threshold (e.g., the first threshold of FIG. 4) may be less than the second threshold (e.g., the second threshold of FIG. 4).

According to various embodiments of the disclosure, the at least one first band (e.g., the first band of FIG. 7) may include at least part of a 6 GHz band, and the at least one second band (e.g., the second band of FIG. 7) may include at least one of a 2.4 GHz band or a 5 GHz band.

According to various embodiments of the disclosure, the at least one first band (e.g., the first band of FIG. 7) may be determined based on at least one of a type of the electronic device (e.g., the electronic device 101 of FIG. 1), previous connection information about the external electronic device (e.g., the external electronic device 201 of FIG. 2), or frequency band information received from the external electronic device (e.g., the external electronic device 201 of FIG. 2).

According to various embodiments of the disclosure, the previous connection information about the external electronic device (e.g., the external electronic device 201 of FIG. 2) may be identified based on at least one of a model name, a manufacturer, or a MAC address of the external electronic device (e.g., the external electronic device 201 of FIG. 2).

According to various embodiments of the disclosure, the first communication scheme may be at least one of a Bluetooth communication scheme, a BLE communication scheme, or a UWB communication scheme, and the second communication scheme may be a Wi-Fi communication scheme.

According to various embodiments of the disclosure, the electronic device (e.g., the electronic device 101 of FIG. 1) may further include a processor (e.g., the processor 120 of FIG. 1). The second communication circuit (e.g., the WLAN module 307 of FIG. 3A) may be further configured to receive execution information about the first function from at least one of the first communication circuit (e.g., the UWB module 315 or the Bluetooth module 317 of FIG. 3A) or the processor (e.g., the processor 120 of FIG. 1), and identify execution of the first function based on the reception of the execution information about the first function.

According to various embodiments of the disclosure, the execution of the first function may include at least one of execution of a first application corresponding to the first function in the electronic device (e.g., the electronic device 101 of FIG. 1) or execution of a second application corresponding to the first function in the external electronic device (e.g., the external electronic device 201 of FIG. 2) with the established first connection (e.g., the first connection 203a of FIG. 2).

According to various embodiments of the disclosure, the first function may be executed based on at least one of a carkit profile, a hands free profile (HFP), an advanced audio distribution profile (A2DP), or a serial port profile (SPP).

According to various embodiments of the disclosure, the electronic device may further include a third communication circuit (e.g., the UWB module 315 or the Bluetooth module 317 of FIG. 3A) supporting a third communication scheme different from the first communication scheme. The first communication circuit (e.g., the UWB module 315 or the Bluetooth module 317 of FIG. 3A) may be configured to establish the first connection (e.g., the first connection 203a of FIG. 1) with the external electronic device (e.g., the external electronic device 201 of FIG. 2) based on a distance between the external electronic device (e.g., the external electronic device 201 of FIG. 2) and the electronic device (e.g., the electronic device 101 of FIG. 1), identified using the third communication circuit (e.g., the UWB module 315 or the Bluetooth module 317 of FIG. 3A).

According to various embodiments of the disclosure, the first threshold (e.g., the first threshold of FIG. 4) may be determined based on a type of the electronic device (e.g., the electronic device 101 of FIG. 1).

According to various embodiments of the disclosure, the electronic device (e.g., the electronic device 101 of FIG. 1) may further include a processor (e.g., the processor 120 of FIG. 1), and the second communication circuit (e.g., the WLAN module 307 of FIG. 3A) may further include at least one PA (e.g., the PA 309 of FIG. 3A). At least one of the processor (e.g., the processor 120 of FIG. 1) or the second communication circuit (e.g., the WLAN module 307 of FIG. 3A) may be further configured to determine a voltage value to be applied as a bias voltage of the at least one PA (e.g., the PA 309 of FIG. 3A), and control the at least one PA (e.g., the PA 309 of FIG. 3A) to output power equal to or less than the first threshold (e.g., the first threshold of FIG. 4) based on the bias voltage of the determined voltage value.

According to various embodiments of the disclosure, the second communication circuit (e.g., the WLAN module 307 of FIG. 3A) may be further configured to scan the external electronic device (e.g., the external electronic device 201 of FIG. 2), using a signal having a first strength equal to or less than the first threshold (e.g., the first threshold of FIG. 4) based on the execution of the first function.

According to various embodiments of the disclosure, the second communication circuit (e.g., the WLAN module 307 of FIG. 3A) may be further configured to scan the external electronic device (e.g., the external electronic device 201 of FIG. 2), using the signal having the first strength, and when the external electronic device (e.g., the external electronic device 201 of FIG. 2) is not identified as a result of the scanning of the external electronic device (e.g., the external electronic device 201 of FIG. 2), scan the external electronic device (e.g., the external electronic device 201 of FIG. 2), using a signal having a second strength greater than the first strength. The first strength and the second strength may be equal to or less than the first threshold (e.g., the first threshold of FIG. 4).

According to various embodiments of the disclosure, the electronic device (e.g., the electronic device 101 of FIG. 1) may further include a processor (e.g., the processor 120), and the second communication circuit (e.g., the WLAN module 307 of FIG. 3A) may be further configured to establish a second connection (e.g., the second connection 203b of FIG. 2) with the external electronic device (e.g., the external electronic device 201 of FIG. 2) based on the transmission of the signal having the strength equal to or less than the first threshold (e.g., the first threshold of FIG. 4). At least one of the processor (e.g., the processor 120) or the second communication circuit (e.g., the WLAN module 307 of FIG. 3A) may be further configured to execute a second function using the established second connection (e.g., the second connection 203b of FIG. 2).

According to various embodiments of the disclosure, the second function may be determined based on at least one of device-related information about the external electronic device (e.g., the external electronic device 201 of FIG. 2), service-related information about the external electronic device (e.g., the external electronic device 201 of FIG. 2), a type of the electronic device (e.g., the electronic device 101 of FIG. 1), a strength of the first threshold (e.g., the first threshold of FIG. 4), a channel band of the second connection (e.g., the second connection 203b of FIG. 2), a type of the first communication scheme, or the presence or absence of a security configuration for the first communication scheme.

According to various embodiments of the disclosure, at least one of the processor (e.g., the processor 120) or the second communication circuit (e.g., the WLAN module 307 of FIG. 3A) may be further configured to execute a third function based on the first connection (e.g., the first connection 203a of FIG. 2) during execution of the second function. The third function may include transmission and reception of voice data via the first connection (e.g., the first connection 203a of FIG. 2), and the second function may include transmission and reception of image data via the second connection (e.g., the second connection 203b of FIG. 2).

According to various embodiments of the disclosure, a method of controlling an electronic device (e.g., the electronic device 101 of FIG. 1) may include establishing a first connection (e.g., the first connection 203a of FIG. 2) with an external electronic device (e.g., the external electronic device 201 of FIG. 2) based on a first communication scheme, using a first communication circuit (e.g., the UWB module 315 or the Bluetooth module 317 of FIG. 3A), and transmitting a signal having a strength equal to or less than a first threshold (e.g., the first threshold of FIG. 4) based on execution of a first function based on the first connection (e.g., the first connection 203a of FIG. 2), using a second communication circuit (e.g., the WLAN module 307 of FIG. 3A). The second communication circuit (e.g., the WLAN module 307 of FIG. 3A) may support a second communication scheme, and may be configured to transmit the signal having the strength equal to or less than the first threshold (e.g., the first threshold of FIG. 4) in at least one first band (e.g., the first band of FIG. 7), and transmit a signal having a strength equal to or less than a second threshold (e.g., the second threshold of FIG. 4) in at least one second band (e.g., the second band of FIG. 7). The first threshold (e.g., the first threshold of FIG. 4) may be less than the second threshold (e.g., the second threshold of FIG. 4).

According to various embodiments of the disclosure, an electronic device (e.g., the electronic device 101 of FIG. 1) may include a first communication circuit (e.g., the UWB module 315 or the Bluetooth module 317 of FIG. 3A) supporting a first communication scheme, and a second communication circuit (e.g., the WLAN module 307 of FIG. 3A) supporting a second communication scheme. The first communication circuit (e.g., the UWB module 315 or the Bluetooth module 317 of FIG. 3A) may be configured to establish a first connection (e.g., the first connection 203a of FIG. 2) with an external electronic device (e.g., the external electronic device 201 of FIG. 2) based on the first communication scheme. The second communication circuit (e.g., the WLAN module 307 of FIG. 3A) may be configured to transmit a signal having a strength equal to or less than a first threshold (e.g., the first threshold of FIG. 4) in a first band (e.g., the first band of FIG. 7), based on a first function based on the first connection (e.g., the first connection 203a of FIG. 2) being executed, and transmit a signal having a strength equal to or less than a second threshold (e.g., the second threshold of FIG. 4) in a second band (e.g., the second band of FIG. 7), based on the first function based on the first connection (e.g., the first connection 203a of FIG. 2) not being executed. The first band (e.g., the first band of FIG. 7) may be different from the second band (e.g., the second band of FIG. 7), and the first threshold (e.g., the first threshold of FIG. 4) may be less than the second threshold (e.g., the second band of FIG. 7).

According to various embodiments of the disclosure, the first band (e.g., the first band of FIG. 7) may be determined based on at least one of a type of the electronic device (e.g., the electronic device 101 of FIG. 1), previous connection information about the external electronic device (e.g., the external electronic device 201 of FIG. 2), or frequency band information received from the external electronic device (e.g., the external electronic device 201 of FIG. 2). The first threshold (e.g., the first threshold of FIG. 4) may be determined based on the type of the electronic device (e.g., the electronic device 101 of FIG. 1).

According to various embodiments of the disclosure, the second communication circuit (e.g., the WLAN module 307 of FIG. 3A) may be further configured to scan the external electronic device (e.g., the external electronic device 201 of FIG. 2) preferentially in a band corresponding to a VLP service in the first band (e.g., the first band of FIG. 7), based on the first function based on the first connection (e.g., the first connection 203a of FIG. 2) being executed.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first communication circuit supporting a first communication scheme; and
a second communication circuit supporting a second communication scheme, and configured to:
transmit a signal having a strength equal to or less than a first threshold in at least one first band, and
transmit a signal having a strength equal to or less than a second threshold in at least one second band,
wherein the first communication circuit is configured to establish a first connection with an external electronic device based on the first communication scheme,
wherein the second communication circuit is configured to:
transmit the signal having the strength equal to or less than the first threshold in the at least one first band from among the at least one first band and the at least one second band using the second communication scheme, in response to execution of a first function based on the first connection, and
transmit the signal having the strength equal to or less than the second threshold in the at least one second band using the second communication scheme, in response to non-execution of the first function based on the first connection, and
wherein the first threshold is less than the second threshold.

2. The electronic device of claim 1,
wherein the at least one first band includes at least part of a 6 GHz band, and
wherein the at least one second band includes at least one of a 2.4 GHz band or a 5 GHz band.

3. The electronic device of claim 1, wherein the at least one first band is determined based on at least one of a type of the electronic device, previous connection information about the external electronic device, or frequency band information received from the external electronic device.

4. The electronic device of claim 3, wherein the previous connection information about the external electronic device is identified based on at least one of a model name, a manufacturer, or a medium access control (MAC) address of the external electronic device.

5. The electronic device of claim 1,
wherein the first communication scheme includes at least one of a Bluetooth communication scheme, a Bluetooth low energy (BLE) communication scheme, or an ultra-wideband (UWB) communication scheme, and
wherein the second communication scheme includes a wireless-fidelity (Wi-Fi) communication scheme.

6. The electronic device of claim 1, further comprising:
at least one processor,
wherein the second communication circuit is further configured to:
receive execution information about the first function from at least one of the first communication circuit or the at least one processor, and
identify execution of the first function based on reception of the execution information about the first function.

7. The electronic device of claim 1, wherein the execution of the first function includes at least one of execution of a first application corresponding to the first function in the electronic device or execution of a second application corresponding to the first function in the external electronic device with the established first connection.

8. The electronic device of claim 1, wherein the first function is executed based on at least one of a carkit profile, a hands free profile (HFP), an advanced audio distribution profile (A2DP), or a serial port profile (SPP).

9. The electronic device of claim 1, further comprising:
a third communication circuit supporting a third communication scheme different from the first communication scheme,
wherein the first communication circuit is further configured to establish the first connection with the external electronic device based on a distance between the external electronic device and the electronic device, identified using the third communication circuit.

10. The electronic device of claim 1, wherein the first threshold is determined based on a type of the electronic device.

11. The electronic device of claim 1, further comprising:
at least one processor,
wherein the second communication circuit further includes at least one power amplifier (PA), and
wherein the at least one of the at least one processor or the second communication circuit is further configured to:
determine a voltage value to be applied as a bias voltage of the at least one PA, and
control the at least one PA to output power equal to or less than the first threshold based on the bias voltage of the determined voltage value.

12. The electronic device of claim 1, wherein the second communication circuit is further configured to scan the external electronic device, using a signal having a first strength equal to or less than the first threshold based on the execution of the first function.

13. The electronic device of claim 12,
wherein the second communication circuit is further configured to:
scan the external electronic device, using the signal having the first strength, and
when the external electronic device is not identified as a result of scanning of the external electronic device, scan the external electronic device, using a signal having a second strength greater than the first strength, and wherein the first strength and the second strength are equal to or less than the first threshold.

14. The electronic device of claim 1, further comprising:

at least one processor, wherein the second communication circuit is further configured to establish a second connection with the external electronic device based on transmission of the signal having the strength equal to or less than the first threshold, and wherein at least one of the at least one processor or the second communication circuit is further configured to execute a second function using the established second connection.

15. The electronic device of claim 14, wherein the second function is determined based on at least one of information related to the external electronic device, information of service related to the external electronic device, information of a type of the electronic device, a size of the first threshold, a channel band of the second connection, a type of the first communication scheme, or a security setting of the first communication scheme.

16. The electronic device of claim 14, wherein one of the at least one of the at least one processor or the second communication circuit is further configured to:

execute a third function based on the first connection while the second function is executed, wherein the third function includes transmission and reception of voice data through the first connection, and wherein the second function includes transmission and reception of image data through the second connection.

17. A method of controlling an electronic device, the method comprising:

establishing a first connection with an external electronic device based on a first communication scheme, using a first communication circuit; and transmitting a signal having a strength equal to or less than a first threshold based on execution of a first function based on the first connection, using a second communication circuit, wherein the second communication circuit supports a second communication scheme, and is configured to transmit the signal having the strength equal to or less than the first threshold in at least one first band from among the at least one first band and at least one second band using the second communication scheme, and transmit a signal having a strength equal to or less than a second threshold in at least one second band, wherein the second communication circuit is configured to transmit the signal having the strength equal to or less than the second threshold in the at least one second band based on non-execution of the first function based on the first connection, and wherein the first threshold is less than the second threshold.

18. An electronic device comprising:

a first communication circuit supporting a first communication scheme; and a second communication circuit supporting a second communication scheme;

wherein the first communication circuit set to form a first connection with an external electronic device based on the first communication scheme, wherein the second communication circuit configured to:

transmit a signal having a size less than or equal to a first threshold in a first band from among the first band and a second band using the second communication scheme, in response to execution of a first function based on the first connection, transmit a signal having a size less than or equal to a second threshold in the second band based on not executing the first function based on the first connection, wherein the first band is different from the second band, and wherein the first threshold is smaller than the second threshold.

19. The electronic device of claim 18, further comprising:

wherein the first band is determined based on at least one of a type of the electronic device, information of previous connection of the external electronic device, or information of frequency band received from the external electronic device, and wherein the first threshold is determined based on a type of the electronic device.

20. The electronic device of claim 18, further comprising:

at least one processor, wherein the second communication circuit is further configured to:

based on the execution of the first function based on the first connection, the first band is further configured to preferentially scan the external electronic device for a band corresponding to a very low power (VLP) among the first band.

21. The electronic device of claim 18, wherein, when activation of the second communication circuit with the first connection is not established, the second communication circuit is configured to be activated to transmit a signal having a strength equal to or less than the second threshold.

* * * * *